United States Patent
Leone et al.

(10) Patent No.: US 7,694,760 B2
(45) Date of Patent: Apr. 13, 2010

(54) SYSTEM AND METHOD FOR CONTROLLING VEHICLE OPERATION

(75) Inventors: Thomas Leone, Ypsilanti, MI (US); Gopichandra Surnilla, West Bloomfield, MI (US); Tony Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1073 days.

(21) Appl. No.: 11/369,535

(22) Filed: Mar. 6, 2006

(65) Prior Publication Data

US 2007/0205028 A1    Sep. 6, 2007

(51) Int. Cl.
*B60K 6/04* (2006.01)
(52) U.S. Cl. ................ 180/65.21; 180/65.23
(58) Field of Classification Search .......... 180/65.21, 180/65.225, 65.23, 65.235, 65.24, 65.245, 180/65.25, 65.28, 65.29, 65.31, 65.6; 123/294, 123/295; 701/70
See application file for complete search history.

(56) References Cited

U.S. PATENT DOCUMENTS

| | | | | |
|---|---|---|---|---|
| 4,433,549 A | * | 2/1984 | Zappia | 60/712 |
| 6,170,587 B1 | * | 1/2001 | Bullock | 180/69.6 |
| 6,209,672 B1 | * | 4/2001 | Severinsky | 180/65.23 |
| 6,267,097 B1 | | 7/2001 | Urushihara et al. | |
| 6,276,334 B1 | | 8/2001 | Flynn et al. | |
| 6,293,246 B1 | | 9/2001 | Tanahashi et al. | |
| 6,336,436 B1 | | 1/2002 | Miyakubo et al. | |
| 6,341,584 B1 | * | 1/2002 | Itoyama et al. | 123/90.15 |
| 6,390,054 B1 | | 5/2002 | Yang | |
| 6,516,774 B2 | | 2/2003 | zur Loye et al. | |
| 6,570,265 B1 | | 5/2003 | Shiraishi et al. | |
| 6,600,980 B1 | * | 7/2003 | Kraska et al. | 701/22 |

(Continued)

OTHER PUBLICATIONS

Thomas Leone, et al., System and Method for Controlling Vehicle Operation, Mar. 6, 2006.
Thomas Leone, et al., System and Method for Controlling Vehicle Operation in Response to Fuel Vapor Purging, Mar. 6, 2006.
Michael Andri, "System and Method for Operation of an Engine Having Multiple Combustion Modes and Cylinder Deactivation", Mar. 6, 2006.

(Continued)

*Primary Examiner*—Glenn Dayoan
*Assistant Examiner*—Bridget Avery
(74) *Attorney, Agent, or Firm*—Allan J. Lippa; Alleman Hall McCoy Russell & Tuttle LLP

(57) ABSTRACT

A hybrid vehicle propulsion system is disclosed comprising an engine having at least one combustion cylinder configured to operate in a first and a second combustion mode, wherein the first combustion mode is a spark ignition mode and the second combustion mode is a compression ignition mode, wherein the engine is configured to supply an engine output; a motor configured to selectively supply or absorb a secondary output; an energy storage device configured to selectively store at least a portion of the engine output and selectively supply energy to the vehicle; and a control system configured to control at least the engine, the motor, and the energy storage device, wherein the control system is configured to selectively operate said at least one combustion cylinder in one of the spark ignition mode and the compression ignition mode based on a condition of the energy storage device.

13 Claims, 16 Drawing Sheets

U.S. PATENT DOCUMENTS

| | | |
|---|---|---|
| 6,619,254 B2 | 9/2003 | Chmela et al. |
| 6,725,825 B1 | 4/2004 | Kurtz et al. |
| 6,739,295 B1 | 5/2004 | Yamaoka et al. |
| 6,923,167 B2 | 8/2005 | Flowers |
| 6,932,175 B2 | 8/2005 | Teraji et al. |
| 6,951,211 B2 * | 10/2005 | Bryant .................... 123/559.1 |
| 7,243,633 B2 * | 7/2007 | Berger .................... 123/198 F |
| 7,487,852 B2 * | 2/2009 | Leone et al. ........... 123/406.44 |
| 2004/0065279 A1 | 4/2004 | Hitomi et al. |
| 2004/0182359 A1 | 9/2004 | Stewart et al. |
| 2005/0121008 A1 | 6/2005 | Kilkenny et al. |
| 2005/0173169 A1 | 8/2005 | Gray, Jr. |

OTHER PUBLICATIONS

Lang et al., "Thermodynamical and Mechanical Approach Towards a Variable Valve Train for the Controlled Auto Ignition Combustion Process," SAE Technical Paper Series, Apr. 11-14, 2005, 2005-01-0762, SAE International, Warrendale, Pennsylvania.

* cited by examiner

SYSTEM AND METHOD FOR CONTROLLING VEHICLE OPERATION

CROSS-REFERENCE TO RELATED APPLICATIONS

This application is related to U.S. application Ser. No. 11/369,669, filed Mar. 6, 2006 by Thomas Leone, Gopichandra Surnilla, and Tony Phillips, and titled SYSTEM AND METHOD FOR CONTROLLING VEHICLE OPERATION, and U.S. application Ser. No. 11/370,080, filed Mar. 6, 2006 by Thomas Leone, Gopichandra Surnilla, and Tony Phillips, and titled SYSTEM AND METHOD FOR CONTROLLING VEHICLE OPERATION IN RESPONSE TO FUEL VAPOR PURGING. The entirety of the above listed application is incorporated herein by reference for all purposes.

BACKGROUND AND SUMMARY

Internal combustion engines of a vehicle may operate in various combustion modes. One example mode is spark ignition (SI), where a spark performed by a sparking device is used to initiate combustion of an air and fuel mixture. Another example mode is homogeneous charge compression ignition (HCCI), where an air and fuel mixture achieves a temperature where autoignition occurs without requiring a spark from a sparking device. In some conditions, HCCI may have greater fuel efficiency and reduced NOx production compared to SI. However, in some conditions, such as with high or low engine loads, it may be difficult to achieve reliable HCCI combustion.

One approach in this field is US Pub. No. 2005/0173169, which uses a dual combustion mode engine configured in a hybrid vehicle propulsion system. Specifically, the engine is configured to operate in HCCI mode under some conditions and SI mode under some conditions, where the hybrid system may be used in conjunction with the engine to reduce transitions between combustion modes and provide the requested output to the vehicle drive wheels. Further, the engine output level is controlled based on the amount of stored energy.

However, the inventors herein have recognized a disadvantage with such an approach. Specifically, when trying to decrease engine mode transitions using the hybrid system and simply controlling engine output in response to the amount of stored energy, inefficient operation may result. For example, the available engine power output levels may vary depending on the combustion mode, and thus the engine may be operated in an inefficient manner in order to respond to the amount of stored energy while attempting to avoid mode transitions. In other words, the power output levels of the HCCI mode may be different than those of the spark ignition mode, and thus if the hybrid system is used to maintain a given combustion mode, the engine may be forced to operate inefficiently in order to provide the desired engine output as determined from the amount of stored energy.

Thus, it may be advantageous, at least under some conditions, to adjust combustion modes in a hybrid vehicle in response to the amount of stored energy to provide improved engine operation while still meeting the requirements of the hybrid system. While this may result in increased transitions under some conditions, improved overall hybrid system operation may be achieved. For example, under some conditions, the hybrid system may be used to reduce transitions (e.g., when sufficient energy storage is available), but under other conditions (e.g., lower levels of energy storage), the hybrid system may actually create a need to transition combustion modes to enable efficient operation or to produce the requested driver output.

In one particular embodiment, a hybrid vehicle propulsion system is provided. The system comprises: an engine having at least one combustion cylinder configured to operate in a first and a second combustion mode, wherein the first combustion mode is a spark ignition mode and the second combustion mode is a compression ignition mode, wherein the engine is configured to supply an engine output; a motor configured to selectively supply or absorb a secondary output; an energy storage device configured to selectively store at least a portion of the engine output and selectively supply energy to the vehicle; and a control system configured to control at least the engine, the motor, and the energy storage device, wherein the control system is configured to selectively operate said at least one combustion cylinder in one of the spark ignition mode and the compression ignition mode based on a condition of the energy storage device.

DETAILED DESCRIPTION OF THE DRAWINGS

DETAILED DESCRIPTION

Figure 1A:
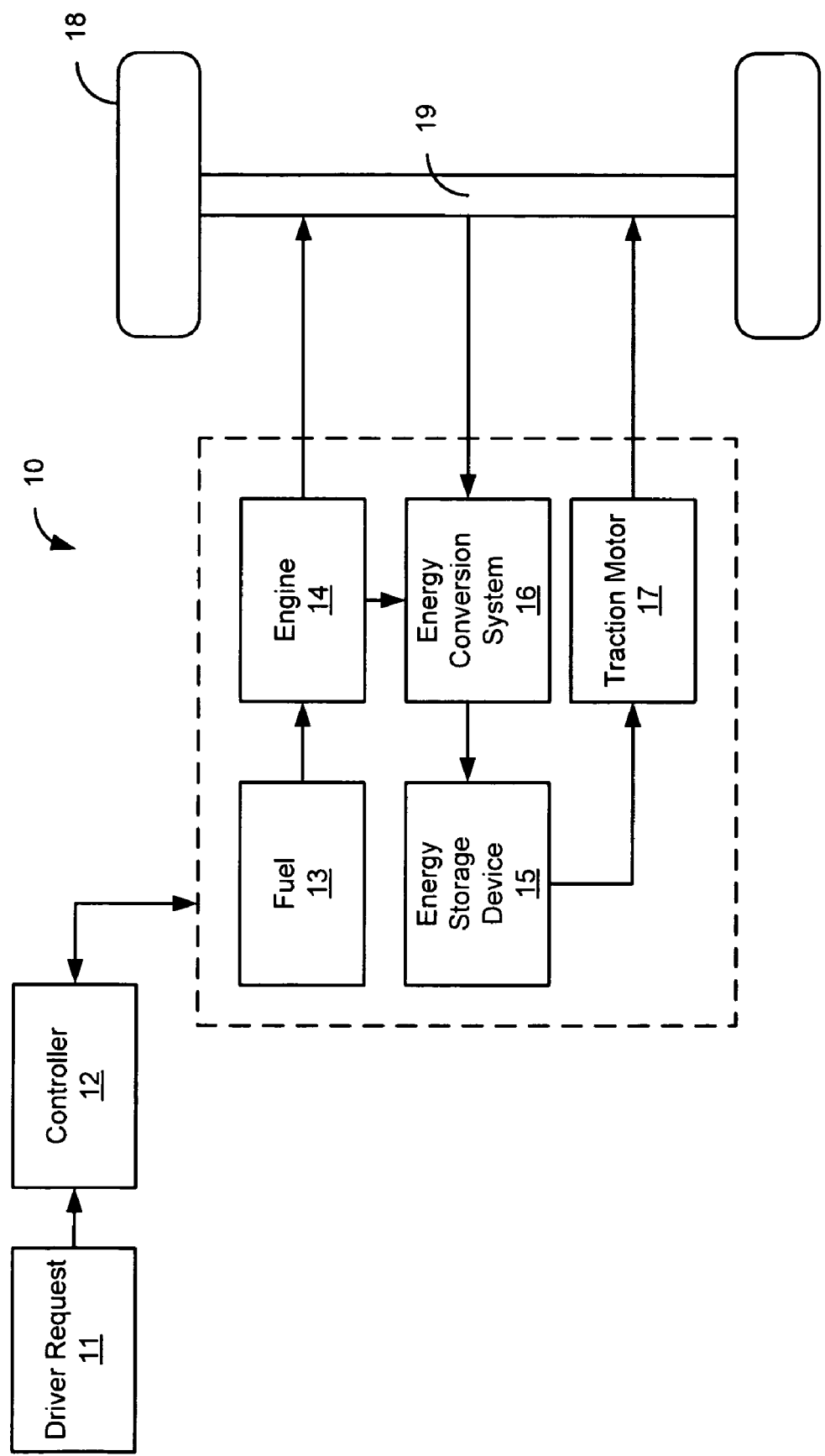
FIG. 1A is a schematic diagram of a hybrid propulsion system.

The present disclosure relates to a hybrid vehicle propulsion system having an engine configured to operate in at least two combustion modes. FIG. 1A shows a schematic view of an example hybrid vehicle propulsion system 10. Specifically, FIG. 1A shows controller 12 configured to receive at least an input signal as a driver request 11, which may include a torque, speed and/or power request among others. Controller 12 is further shown communicating with each of the vehicle propulsion system components 13-17 as denoted by the broken line. Engine 14 is shown receiving energy from fuel source 13 and providing an engine output to the vehicle drivetrain 19 and/or the energy conversion system 16 as prescribed by controller 12. The engine fuel source 13 may include a variety of fuels such as, but not limited to: gasoline, diesel, ethanol, etc. and in some examples may include the concurrent use of multiple fuels. Energy conversion system 16 is shown configured to receive an input from engine 14 and/or vehicle drivetrain 19. The energy converted by energy conversion system 16 may be stored in energy storage device 15 and later used to perform a desired vehicle operation. Energy storage device 15 is further configured to supply energy as needed to traction motor 17, which can supply a secondary or supplemental output to drivetrain 19. Drivetrain 19 is configured to transmit the engine output and/or the traction motor output to the drive wheels 18 thereby propelling the vehicle. Thus, the hybrid vehicle may be propelled by a first output from engine 14 and/or a second output from traction motor 17. In some embodiments, a hybrid propulsion system may not have a separate energy conversion system, but may instead operate traction motor 17 to convert energy to a form that is storable by the energy storage device. In this manner, traction motor 17 can be used to supply or absorb energy as desired.

Further, energy conversion system 16 may take various forms. In one non-limiting example, a hybrid electric vehicle (HEV) may comprise an energy conversion system that includes an electric generator configured to convert the engine output and/or the inertia of the vehicle into electrical energy, such as by regenerative braking, etc. Further, the energy storage device of an HEV may include a battery (batteries) and/or a capacitor(s), among others, for storing the electrical energy produced by the electric generator. The traction motor for an HEV may include an electric traction motor configured to convert the electrical energy supplied by the energy storage device into an output such as a torque, a power, and/or a speed. A further discussion of an example HEV configuration will be presented below with reference to FIG. 1B.

In another non-limiting example, the hybrid propulsion system may utilize a hydraulic system rather than an electrical system for converting and storing energy. For example, the energy conversion system may be configured as a hydraulic pump supplying hydraulic fluid pressure to the energy storage device, wherein the energy storage device may include a pressure vessel for storing the pressurized hydraulic fluid. Further, the pressure vessel may be configured to supply pressurized hydraulic fluid to a hydraulic traction motor.

In this manner, the hybrid propulsion system may use other technologies for storing and converting energy and/or supplying a secondary output from the stored energy. For example, a flywheel may be used to store energy for later use. Thus, the hybrid propulsion system may utilize a variety of methods for storing and/or generating vehicle torque, power, and/or speed. In one example, a motor/generator may be coupled to an engine crankshaft to form a mild-hybrid configuration. In another example, the hybrid propulsion system may utilize an energy conversion device configured as a belt driven integrated starter generator (ISG). It should be appreciated that the various components of the hybrid propulsion system shown in FIG. 1A may be configured to operate with one or more other components in a series or parallel configuration, or combinations thereof.

Figure 1B:
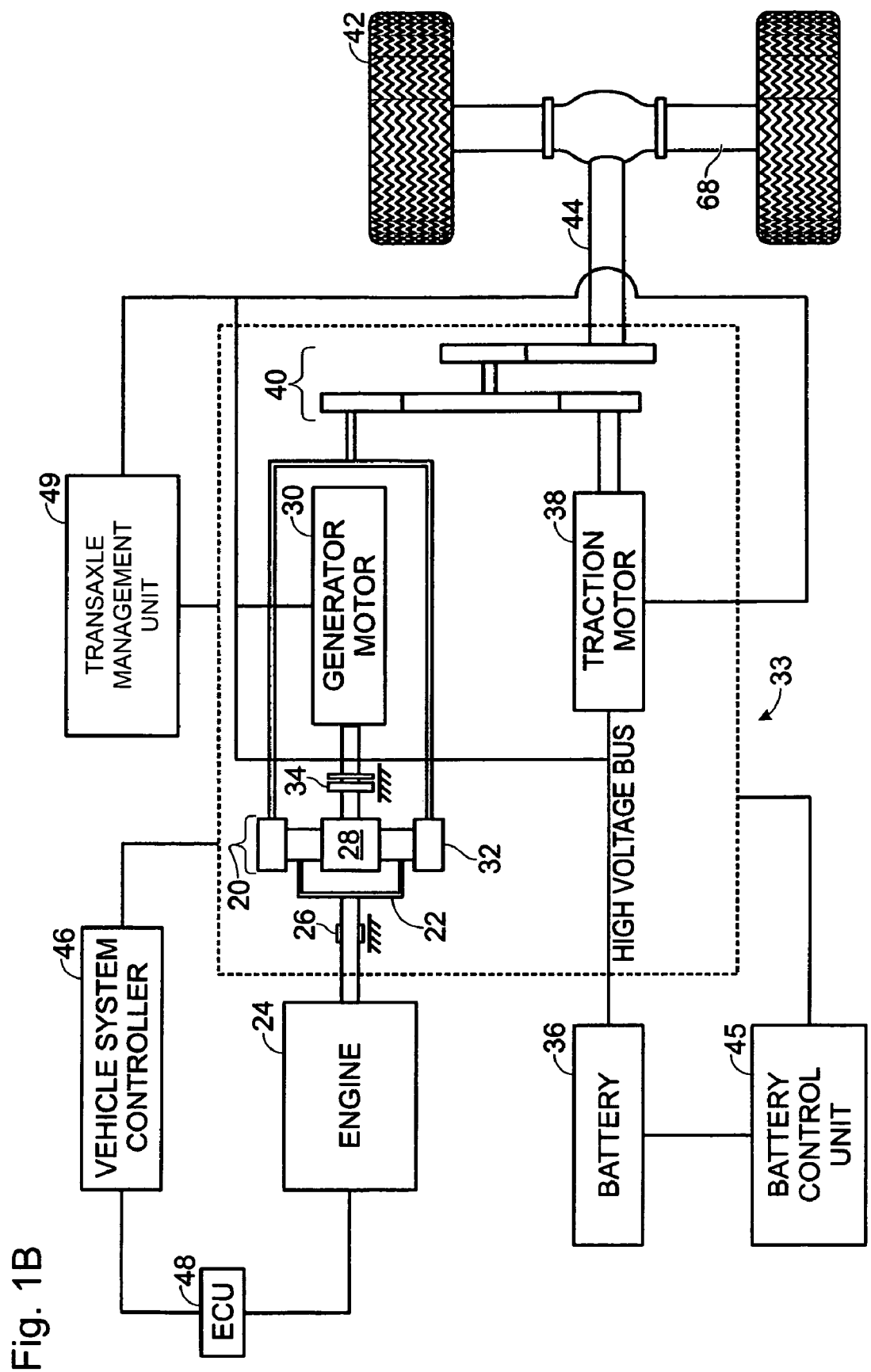
FIG. 1B is a schematic diagram of an example hybrid electric vehicle (HEV) propulsion system.

FIG. 1B illustrates an example HEV propulsion system, specifically a parallel/series hybrid electric vehicle (split) configuration. It should be understood that the various components described herein with reference to FIGS. 1A, 1B, and 2 can be coupled by a vehicle chassis. Engine 24 is shown coupled to the planet carrier 22 of planetary gear set 20. A one-way clutch 26, which allows forward rotation while preventing backward rotation of the engine and planet carrier, is shown. The planetary gear set 20 is also shown mechanically coupling a sun gear 28 to a generator motor 30 and a ring (output) gear 32. The generator motor 30 also mechanically links to a generator brake 34 and is electrically linked to a battery 36. A traction motor 38 is shown mechanically coupled to the ring gear 32 of the planetary gear set 20 via a second gear set 40 and is electrically linked to the battery 36. The ring gear 32 of the planetary gear set 20 and the traction motor 38 are further mechanically coupled to drive wheels 42 via an output shaft 44.

The planetary gear set 20, splits the output energy from the engine 24 into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

Thus, FIG. 1B shows that in this example, engine 24 is attached directly to planet carrier 22 without a clutch that can disconnect them from each other. One-way clutch 26 allows the shaft to rotate freely in a forward direction, but grounds the shaft to the stationary structure of the powertrain when a torque attempts to rotate the shaft backwards. Brake 34 does not interrupt the connection between the sun gear 28 and the generator motor 30, but can, when energized, ground the shaft between those two components to the stationary structure of the powertrain.

A vehicle system controller (VSC) 46 controls many components in this HEV configuration by communicating with each component's controller. An engine control unit (ECU) 48 connects to the engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardwire interface. The TMU 49 controls the generator motor 30 and the traction motor 38 via a hardwire interface. The control units 46, 48, 45 and 49, and controller area network 33 can include one or more microprocessors, computers, or central processing units; one or more computer readable storage devices; one or more memory management units; and one or more input/output devices for communicating with various sensors, actuators and control circuits.

Figure 2:
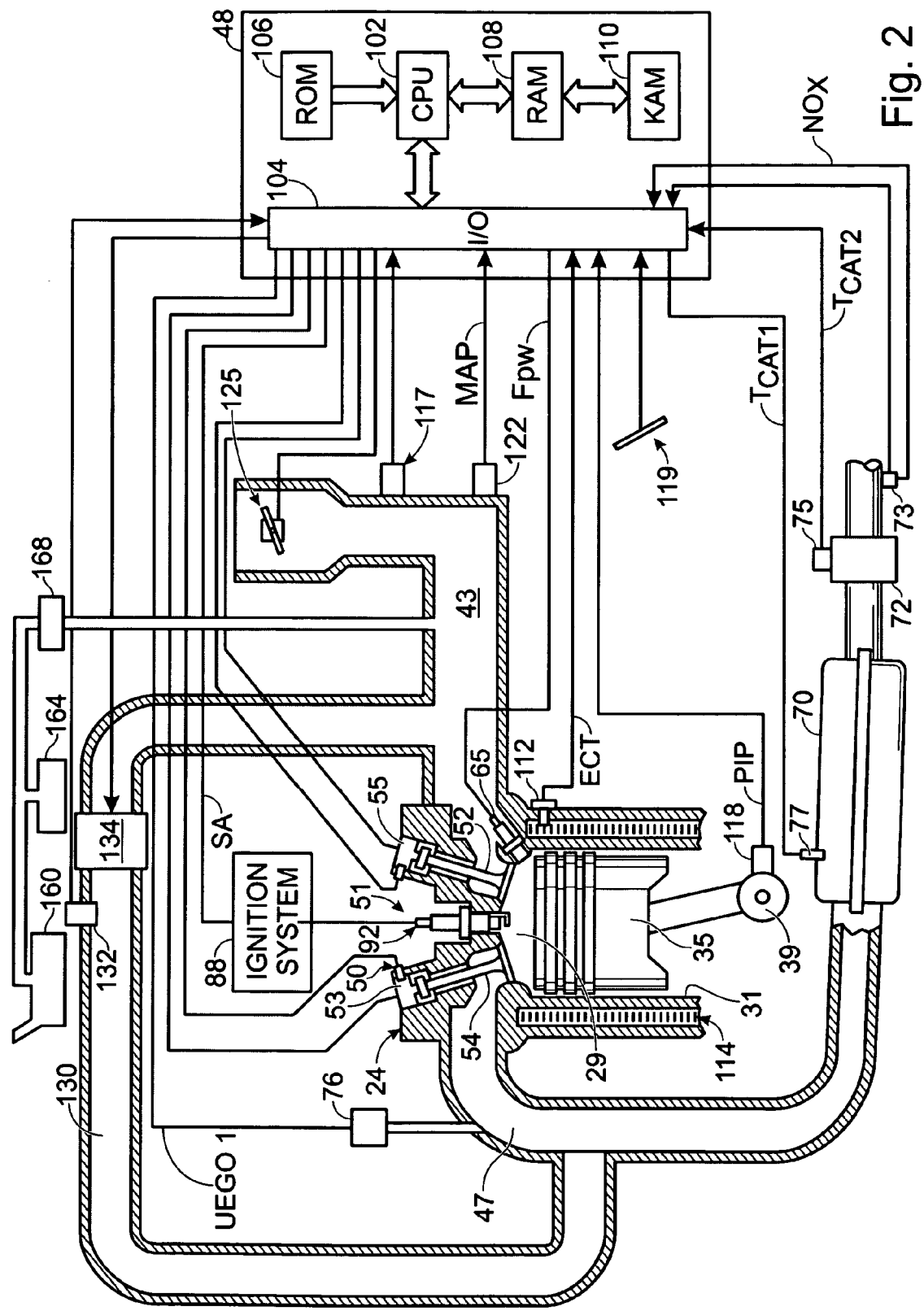
FIG. 2 is a schematic diagram of an example engine.

FIG. 2 shows an example engine 24 as described above with reference to FIG. 1B. Engine 24 is shown in FIG. 2 as a direct injection gasoline engine with a spark plug; however, engine 24 may be a diesel engine without a spark plug, or other type of engine. Internal combustion engine 24 may include a plurality of cylinders, one cylinder of which is shown in FIG. 2, which is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves.

Engine 24 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of autoignition for HCCI combustion.

In some embodiments, as shown in FIG. 2, variable valve timing may be provided by electrically actuated valves (EVA) 53 and 55; however other methods may be used such as variable cam timing (VCT). Also, various types of variable valve timing may be used, such as hydraulic vane-type actuators. Exhaust and intake valve position feedback can be provided via comparison of signals from respective sensors 50 and 51. In some embodiments, cam actuated exhaust valves may be used with electrically actuated intake valves, if desired. In such a case, the controller can determine whether the engine is being stopped or pre-positioned to a condition with the exhaust valve at least partially open, and if so, hold the intake valve(s) closed during at least a portion of the engine stopped duration to reduce communication between the intake and exhaust manifolds. In addition, intake manifold 43 is shown communicating with optional electronic throttle 125.

Engine 24 is also shown having fuel injector 65 coupled thereto for delivering liquid fuel in proportion to the pulse width of signal FPW from controller 48 directly to combustion chamber 29. As shown, the engine may be configured such that the fuel is injected directly into the engine cylinder, which is known to those skilled in the art as direct injection. Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. The signal from sensor 76 can be used to advantage during feedback air/fuel control in a conventional manner to maintain average air/fuel at stoichiometry during the stoichiometric homogeneous mode of operation.

Controller 48 is shown in FIG. 2 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In some embodiments, the requested wheel output can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

FIG. 2 shows engine 24 configured with an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust passage 47 downstream of lean NOx trap 72, wherein gas sensor 73 can be configured to measure the concentration of NOx and/or $O_2$ in the exhaust gas. Lean NOx trap 72 may include a three-way catalyst that is configured to adsorb NOx when engine 24 is operating lean of stoichiometry. The adsorbed NOx can be subsequently reacted with HC and CO and catalyzed when controller 48 causes engine 24 to operate in either a rich homogeneous mode or a near stoichiometric homogeneous mode. Such operation can occur during a NOx purge cycle when it is desired to purge stored NOx from the lean NOx trap, or during a vapor purge cycle to recover fuel vapors from fuel tank 160 and fuel vapor storage canister 164 via purge control valve 168, or during operating modes requiring more engine power, or during operation modes regulating temperature of the emission control devices such as catalyst 70 or lean NOx trap 72. It will be understood that various different types and configurations of emission control devices and purging systems may be employed.

In some embodiments, engine 24 can be shut-off while wheel output can be supplied by the traction motor if necessary, or the cylinders may be operating without fuel injection while the engine continues to rotate. During engine shut-off, crankshaft 39 may be rotated to a position that puts one of the cylinders very near top dead center (TDC), end of compression. In this way, the engine may be easier to restart (at the initiation of cranking, the crankshaft of an engine in this position can get up to speed faster because very little of the initial cranking energy is absorbed by compression of air within a cylinder. In the case of an even firing 4-cylinder, four stroke engine, when engine crank is initiated from a substantially TDC condition, a minimal amount of the cranking energy during the first few degrees of crankshaft rotation is absorbed by acceleration of the piston masses). In other words, in the example of a 4-cylinder engine, it would normally stop with one cylinder after TDC, compression, and the next cylinder approximately the same distance before its TDC, compression, to balance the spring forces of compression of gasses in the cylinders. On an engine with an even number of cylinders, this normal stop position is highly unlikely to have any cylinder valve overlap. However, this stop position may be an unfavorable position for quick restart of the engine. Thus, in one example, pre-positioning may be used as noted above, which may be accomplished via torque created by generator motor 30 to rotate the crankshaft to put a piston slightly before TDC and one-way clutch 26 that prevents the crankshaft from rotating backwards.

However, on a four stroke engine with an even number of cylinders and an even firing interval, whenever one cylinder is at TDC, end of compression, another cylinder is at TDC, end of exhaust. Depending on the engine's valve event timing, the cylinder at TDC, end of exhaust, may be at a position of valve event overlap, with the exhaust valve not yet completely closed and with the intake valve already starting to open. If at least one cylinder of an engine is at a valve overlap position when the engine is not running, it is possible to have air pass from the intake manifold to the exhaust manifold through that cylinder. This can increase emissions, especially in a lean (gasoline or diesel) HEV. For example, it can introduce excess oxygen into an emission control device, such as a NOx trap, causing a degradation of the system performance and an increase of exhaust emissions.

Thus, in some embodiments, adjustments are made so that the engine is not stopped (or at least stopped less often) and left in a position where any cylinder has both the exhaust and the intake valves partially open. This can be achieved in various ways, such as, for example:

1) Exhaust variable valve timing (VVT) can be adjusted before, during, or after, engine shut-down to eliminate or reduce valve overlap in the shut-down condition;

2) Intake VVT can be adjusted before, during, or after, engine shut-down to eliminate or reduce valve overlap in the shut-down condition;

3) (in the case of a 4-cylinder 4-cycle engine) a pre-positioning strategy can be configured to position all pistons far enough from TDC, end of exhaust, where the valve overlap occurs, to make sure that the intake valve of the cylinder nearest TDC, exhaust, has not yet begun to open.

Further, combinations of these approaches may be used. Note also that under approach 3, different stopping locations may be desired for different engine types, such as V-type engines, engines of more or fewer cylinders, etc. As an example of approach 3, the motor may be controlled to position a cylinder far enough before its TDC, compression that the corresponding cylinder that is approaching TDC, exhaust, still has its intake valve closed. The compressed air within the cylinder that is approaching TDC, compression, would tend to make the crankshaft rotate backwards, but one-way clutch 26 would prevent backwards rotation of the crankshaft. This new position could be almost as favorable for quick restart, while reducing communication between the intake and exhaust manifold.

As will be described in more detail below, combustion in engine 24 can be of various types, depending on a variety of conditions. In one example, spark ignition (SI) may be used where the engine utilizes a sparking device to perform a spark so that a mixture of air and fuel combusts. In another example, homogeneous charge compression ignition (HCCI) may be used where a substantially homogeneous air and fuel mixture attains an autoignition temperature within the combustion chamber and combusts without requiring a spark from a sparking device. However, other types of combustion are possible. For example, the engine may operate in a spark assist mode, wherein a spark is used to initiate autoignition of an air and fuel mixture. In yet another example, the engine may operate in a compression ignition mode that is not necessarily homogeneous. It should be appreciated that the examples disclosed herein are non-limiting examples of the many possible combustion modes.

During SI mode, the temperature of intake air entering the combustion chamber may be near ambient air temperature and is therefore substantially lower than the temperature required for autoignition of the air and fuel mixture. Since a spark is used to initiate combustion in SI mode, control of intake air temperature may be more flexible as compared to HCCI mode. Thus, SI mode may be utilized across a broad range of operating conditions (such as higher or lower engine loads), however SI mode may produce different levels of emissions and fuel efficiency under some conditions compared to HCCI combustion.

In some conditions, during SI mode operation, engine knock may occur if the temperature within the combustion chamber is too high. Thus, under these conditions, engine operating conditions may be adjusted so that engine knock is reduced, such as by retarding ignition timing, reducing intake charge temperature, varying combustion air-fuel ratio, or combinations thereof.

During HCCI mode operation, the air/fuel mixture may be highly diluted by air and/or residuals (e.g. lean of stoichiometry), which results in lower combustion gas temperature. Thus, engine emissions may be substantially lower than SI combustion under some conditions. Further, fuel efficiency with autoignition of lean (or diluted) air/fuel mixture may be increased by reducing the engine pumping loss, increasing gas specific heat ratio, and by utilizing a higher compression ratio. During HCCI combustion, autoignition of the combustion chamber gas may be controlled so as to occur at a prescribed time so that a desired engine torque is produced. Since the temperature of the intake air entering the combustion chamber may be relevant to achieving the desired autoignition timing, operating in HCCI mode at high and/or low engine loads may be difficult.

Controller 48 can be configured to transition the engine between a spark ignition (SI) mode and a homogeneous charge compression ignition (HCCI) mode based on operating conditions of the engine and/or related systems, herein described as engine operating conditions.

In some embodiments, engine 24 while operating in HCCI mode may transition to SI mode to purge the lean NOx trap. Since it may be desirable to reduce transitions between combustion modes, the condition of the lean NOx trap can be considered in conjunction with engine operating conditions before performing a transition. Alternatively, in some embodiments, the lean NOx trap may be purged, irregardless of or independent from the condition of the lean NOx trap, prior to transitioning to HCCI mode to maximize the capacity of the trap thereby further reducing future engine transitions. The condition of the lean NOx trap may be inferred through estimation based on engine past or predicted engine operating conditions and/or may be measured by sensor 75 or NOx sensor 73, for example. If it is determined or predicted that the capacity of the lean NOx trap needs purging, the engine may transition from HCCI mode to SI mode or remain in SI mode, wherein the engine is temporarily operated at stoichiometry or rich of stoichiometry to purge the lean NOx trap. In some embodiments, transitions between combustion modes may include an intermediate combustion mode, which could include any of the combustion modes described herein among others.

In some embodiments, the controller may be configured to transition the engine from HCCI mode to SI mode when the temperature of the exhaust aftertreatment system (catalyst 70 and/or lean NOx trap 72, among others) is determined to be too low (i.e. lower than a threshold), since the HCCI exhaust temperature can be substantially lower than the SI exhaust temperature under some conditions. Alternatively, in some embodiments, a transition from SI mode to HCCI mode may be performed when the exhaust temperature is determined to be too high and/or higher than a threshold. Further, in some embodiments, a transition between combustion modes may be based at least partially on a condition of the heating ventilation and air conditioning (HVAC) system. For example, during some conditions, HCCI mode may not provide sufficient passenger cabin heat in cold ambient conditions. In another example, if an air conditioning (A/C) compressor is operated, the additional engine output required to operate the compressor may cause the engine output to become greater than an upper limit of the HCCI operating range. Further, in some embodiments, a transition between combustion modes may be based at least partially on a condition or state of the transmission. For example, when the torque converter is in a locked configuration, the high torque pulsations and high rate of pressure rise from HCCI operations may be less acceptable than when the torque converter is in an unlocked configuration. In other words, the operating range for HCCI mode may be different depending on whether the converter is locked or unlocked. Similarly, different gears or gearing configurations within the transmission may be more sensitive to noise, vibration, and harshness (NVH) during HCCI mode. Thus, it should be understood that the controller may be configured to transition the engine between combustion modes based on any of the above mentioned conditions.

As described above with reference to FIG. 2, engine 24 may include a fuel vapor purge system comprising fuel tank 160, fuel vapor storage canister 164, and purge control valve 168 fluidly coupled to intake manifold 43. In some embodiments, the internal combustion engine can be configured to operate in a first purge state, in which fuel vapors are permitted to be received from the fuel vapor purge system only into combustion cylinders that are operating in the spark ignition mode, and in a second purge state, in which fuel vapors are permitted to be received from the fuel vapor purge system into combustion cylinders operating in the spark ignition mode and into combustion cylinders operating in the HCCI mode. Such an engine provides the benefits of multiple combustion modes while making efficient use of evaporated fuel vapors. Further, it is possible to reduce uncertainties in auto-ignition timing, thereby enabling improved HCCI operation.

Figure 3:
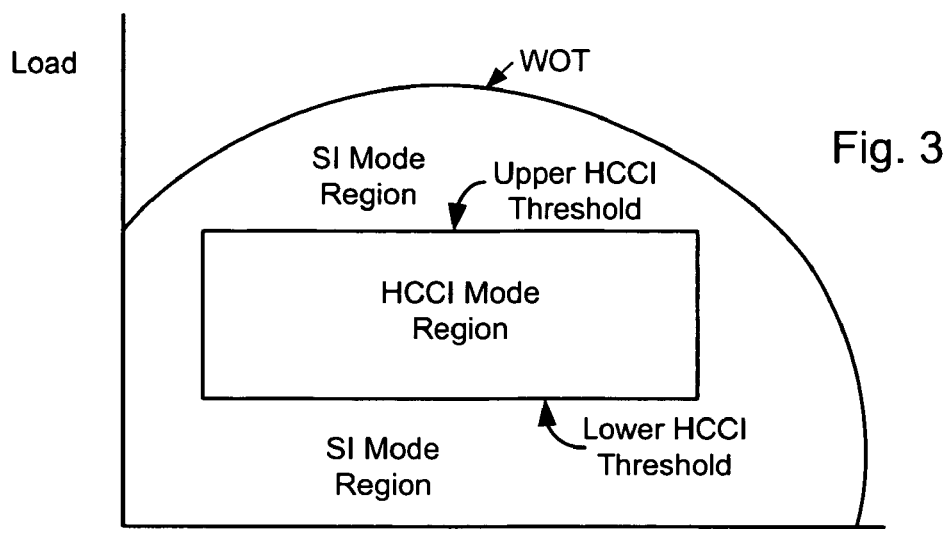
FIG. 3 is a graph showing comparison of an HCCI combustion mode region and an SI combustion mode region.

FIG. 3 shows a graph comparing the SI and HCCI combustion mode regions to wide open throttle (WOT) for an example engine. The graph of FIG. 3 shows engine speed as revolutions per minute (RPM) plotted on the horizontal axis and engine load plotted on the vertical axis. The operating region of the engine described in FIG. 3 is shown to be contained below the WOT curve. The HCCI region is shown centrally located within the engine operating region and the SI region is shown occupying the higher load regions and the lower load regions surrounding the HCCI region. Further, the HCCI region is shown bounded by an upper output threshold and a lower output threshold. It should be appreciated that FIG. 3 shows just one example of the HCCI operating region as other configurations are possible. As development of HCCI technology continues, the HCCI operating region may change as control of the HCCI process is further improved. Furthermore, it should be understood that the HCCI operating region may differ substantially depending on engine configuration and/or engine operating conditions. While only two combustion modes are shown in FIG. 3, the engine may operate with more than two combustion modes.

The operating regions described by FIG. 3 show how an engine can be configured to operate in an SI mode when the engine load is higher or lower than the HCCI region. As shown in FIG. 3, the engine may operate in an HCCI mode when the engine output is greater than the lower HCCI threshold and/or less than the upper HCCI threshold. For example, as the requested wheel output decreases, the engine load may decrease such that the engine approaches the lower limit of the HCCI region. As engine load is further decreased, the engine may transition from HCCI mode to SI mode as the engine load becomes less than the lower HCCI threshold, so that reliable combustion may be achieved. Likewise, the engine may transition from SI mode to HCCI mode as the engine load again increases above the lower HCCI threshold.

In some embodiments, wherein engine 24 includes a plurality of cylinders, the engine may be configured to deactivate one or more of the combustion cylinders. For example, a six cylinder engine may be configured to operate with all six cylinders active when a high engine output is requested, four cylinders (2 cylinders deactivated) when a medium engine output is requested, two cylinders (4 cylinders deactivated) when a low engine output is requested, and all cylinders deactivated when no engine output is requested. Accordingly, the traction motor may be used to supply some, all, or none of the wheel output during a cylinder deactivation operation. A further discussion of deactivating some or all of the engine cylinders is presented in more detail below with reference to FIGS. 9-11.

In some embodiments, deactivation of a cylinder can include the method of stopping fuel delivery to the cylinder for one or more engine cycles. Deactivation of a cylinder may also include the method of continuing to operate one or more valves of the cylinder (i.e. continuing to allow air to flow through the cylinder) and/or stopping one or more valves of the cylinder in an open configuration (i.e. continuing to allow air to flow through the cylinder) or closed configuration (i.e. reducing the airflow through the cylinder).

During transitions between combustion modes, engine operating conditions may be adjusted as needed so that combustion is achieved in the desired mode. For example, in some embodiments, a transition from SI mode to HCCI mode may include increasing the temperature of the intake air entering the combustion chamber to achieve autoignition of the air and fuel mixture. Likewise, during transitions from HCCI mode to SI mode, the intake air temperature may be reduced so that engine knock does not occur. Thus, transitions between combustion modes may necessitate adjustment of engine operating conditions. Engine operating conditions may include intake air temperature, ambient conditions, EGR contributions, turbocharging or supercharging conditions, valve timing, the number of cylinders activated/deactivated, the driver requested output, a condition of the energy storage device, the condition of the lean NOx trap, engine temperature, and/or fuel injection timing among others. The engine operating conditions listed above are just some of the many engine operating conditions that may be adjusted during operation of the engine and transitions between combustion modes. It should be appreciated that other factors may influence the operation of the vehicle propulsion system.

As described above transitions between combustion modes may be difficult under some conditions. Thus, it may be desirable to minimize transitions between combustion modes. An engine configured in a hybrid propulsion system as described above with reference to FIG. 1B may be used to minimize the frequency of transitions between combustion modes and/or between the number of cylinders active or deactivated. In some embodiments, an energy storage device may be used to absorb excess output produced by the engine. For example, a first portion of the engine output may be delivered to the drive wheels to produce a wheel output and a second portion of the engine output may be absorbed by an energy storage device such as a battery. In this manner, the engine may operate in an HCCI mode when the wheel output is less than the lower HCCI threshold. Likewise, when wheel output is greater than an upper HCCI threshold, the traction motor may be used to provide a supplemental output so that the engine output may remain below the upper HCCI threshold. Therefore, the engine may continue operating in HCCI mode as long as a sufficient amount of stored energy is available to operate the motor to produce the additional wheel output. As described herein, the term "output" may refer to a torque, a power, and/or a speed.

Figure 4:
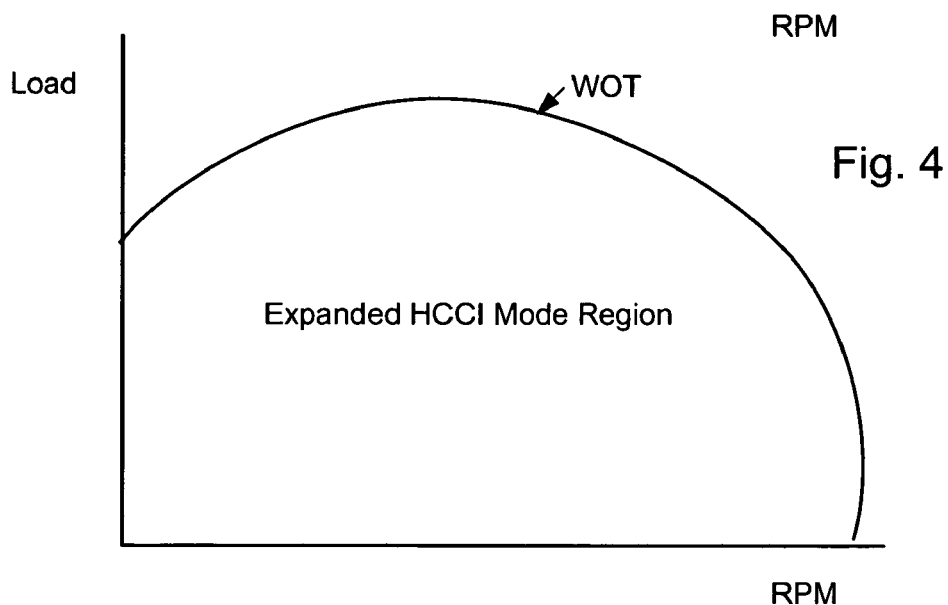
FIG. 4 is a graph showing an expanded HCCI combustion mode region.

FIG. 4 shows a graph of the expanded HCCI combustion mode region when the engine is configured in a hybrid propulsion system. Thus, as shown by FIG. 4, the HCCI operating region may be expanded by using the traction motor to supply a supplemental output when the requested wheel output is greater than the upper HCCI threshold as shown in FIG. 3. Further, the energy conversion system and the energy storage device can be used to absorb excess engine output when the requested wheel output is less than the lower HCCI threshold. While FIG. 3 shows an example amount of expansion, more or less expansion may be provided depending on the parameters of the hybrid system.

Also, in some embodiments, the HCCI operating region may be expanded without use of the hybrid system. For example, when the requested wheel output is less than the lower HCCI threshold, one or more cylinders of the engine can be deactivated (i.e. at least fuel delivery is stopped for the particular cylinder or group of cylinders) thereby decreasing the engine output while the active cylinders remain in HCCI mode. A further discussion of deactivating cylinders is provided below herein.

Figure 5:
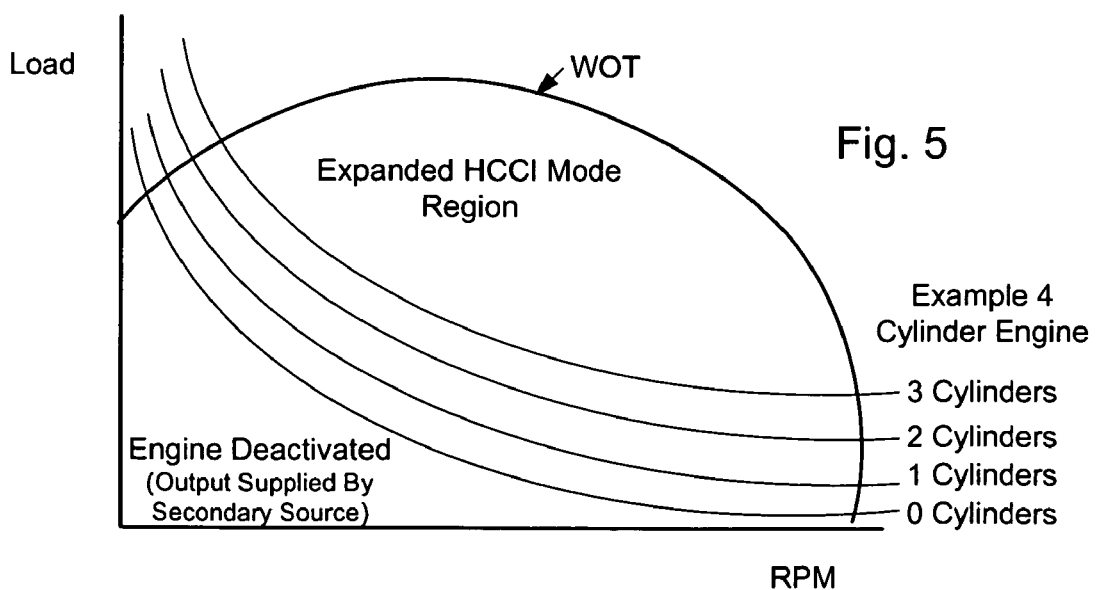
FIG. 5 is a graph showing an expanded HCCI combustion mode region for an example four cylinder engine capable of deactivating some or all of the engine cylinders.

FIG. 5 shows the expanded HCCI region of FIG. 4 with the inclusion of a plurality of cylinder deactivation regions. Specifically, FIG. 5 shows the expanded HCCI mode region for an example 4 cylinder engine. Four lines are shown intersecting the expanded HCCI mode region, wherein each of the four lines corresponds to a particular cylinder configuration region. For example, the region bounded by the WOT curve and the 3-cylinder curve represents the operating region where all four engine cylinders can be operated in HCCI mode without exceeding the upper or lower thresholds described above with reference to FIG. 3. The region bounded by the WOT curve, the 3-cylinder curve, and the 2 cylinder curve represents the operating region where three of the four engine cylinders are activated and one cylinder is deactivated, wherein the activated cylinders can be operated in HCCI mode. In another example, the region bounded by the 0-cylinder curve and the graph axis represents the engine off/deactivated region. During vehicle operation in the engine off/deactivated region, the traction motor can be used to provide the requested wheel output. Likewise, the traction motor can be used to provide additional wheel output in each of the deactivated cylinder regions, if desired. In this manner, the total efficiency of the hybrid vehicle propulsion system can be increased by selectively choosing the number of cylinders (activated/deactivated), the combustion mode in each of the cylinders, and/or the relative amount of output produced by each of the entire engine, the individual engine cylinders, and/or the traction motor. While this example is shown for a 4-cylinder engine, it may be extended to engines with six, eight, ten, twelve, or other number of cylinders.

During engine operation where the engine utilizes a split cylinder configuration (e.g. one or more cylinders deactivated and/or one or more cylinders operating in an HCCI mode and/or SI mode), fluctuations of output and/or engine imbalances may exist, thus potentially yielding increased noise and vibration harshness (NVH). In some embodiments, NVH may reduced by varying the output of the traction motor and/or the amount of energy absorbed by the energy conversion system so that the engine transients are reduced. Further, the effects of discontinuities in engine output, during transitions between combustion modes or while activating/deactivating cylinders may be reduced by operating the hybrid propulsion system to either provide output when a deficiency of engine output is encountered or absorb engine output when a surplus of engine output is encountered.

FIGS. 6-11 show example routines describing the control of a hybrid vehicle propulsion system. Note that the example control and estimation routines included herein can be used with various engine and/or hybrid propulsion system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 48.

Figure 6:
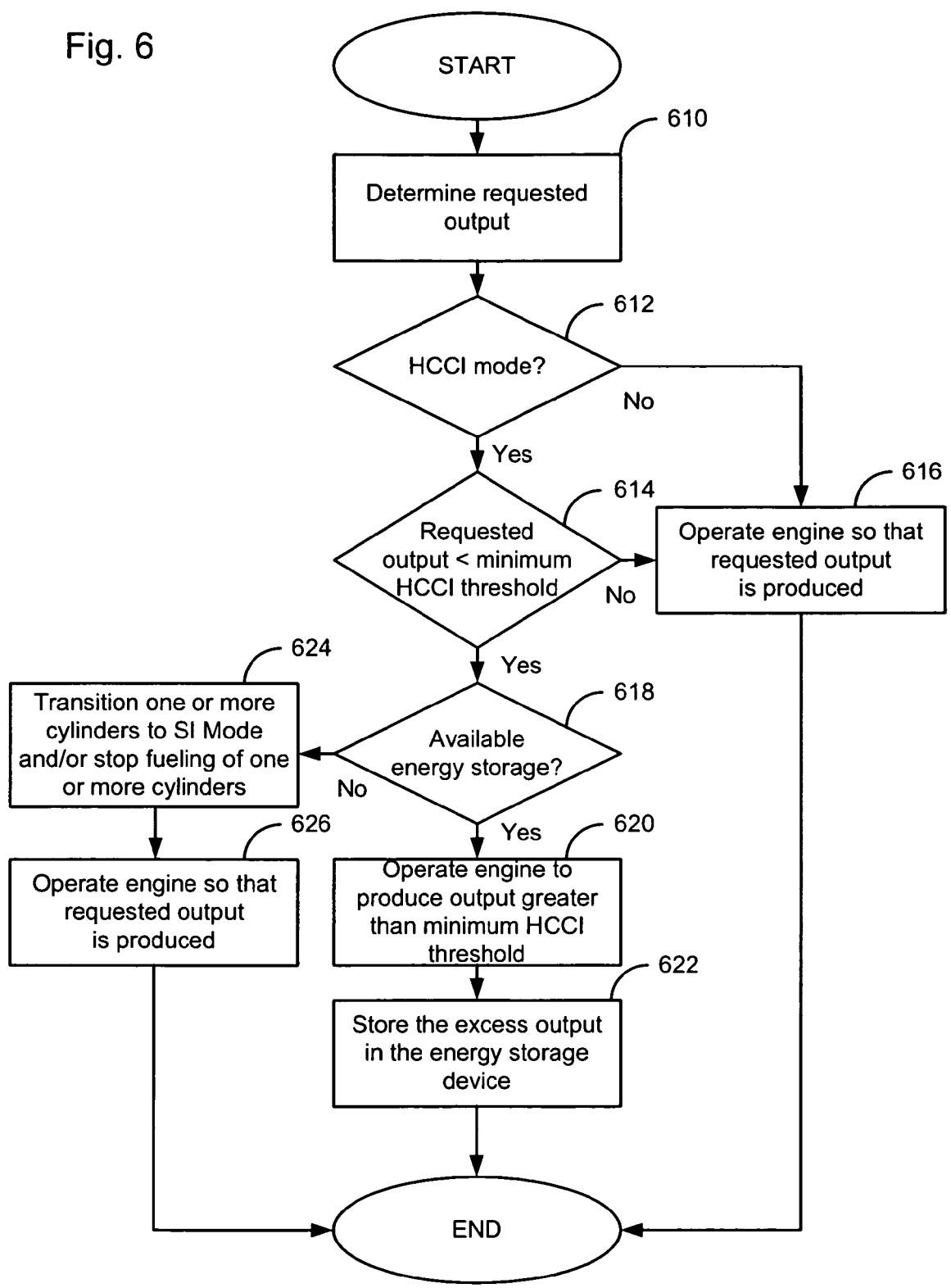
FIGS. 6 and 7 are flow charts showing an example routine for controlling an engine configured in a hybrid propulsion system.

Referring now to FIG. 6, an example routine for controlling the hybrid vehicle propulsion system is shown. Beginning at 610 a requested engine output is determined. The requested engine output may include a requested torque, speed and/or power among others. Further, the requested output may be determined by pedal position or other operating conditions, and may be determined by input from the engine controller and/or driver. Next, at 612 it is judged whether the engine is operating in HCCI mode. If the answer at 612 is yes, the routine proceeds to 614. Alternatively, if the answer at 612 is no, the routine proceeds to 616. At 614 it is judged whether the requested output is less than the lower HCCI threshold as described above with reference to FIG. 3. If the answer at 614 is yes, the routine proceeds to 618. Alternatively, if the answer at 614 is no, the routine proceeds to 616. At 616 the engine is operated so that the requested output is produced. Next, the routine ends.

Returning to 618, it is judged whether energy storage device is able to store additional energy. If the answer is yes, the routine proceeds to 620. Alternatively, if the answer at 618 is no, the routine proceeds to 624, where one or more cylinders of the engine is/are transitioned to SI mode, however any mode may be used that is capable of producing the requested output. For example, the engine may transition to a spark assist mode instead of SI mode. Next, at 626 the engine is operated so that the requested output is produced. Finally, the routine ends. Returning to 620, the engine is operated to produce an output equal to or greater than the lower HCCI threshold as shown in FIG. 3. Next, at 622, an output in excess of the requested output is absorbed by the energy storage device. Next, the routine ends.

In this manner, the energy storage device can be used to absorb a portion of the engine output, thereby enabling the engine to remain in HCCI mode even when the requested output is less than the minimum HCCI threshold. Therefore, the hybrid propulsion system can be used to reduce the number of transitions performed between combustion modes. Note that the term "absorbed" as used herein may include both converting and storing of the engine output and/or powertrain output as desired. Thus, when the energy storage device absorbs a portion of the engine output, both conversion and storage may occur.

Figure 7:
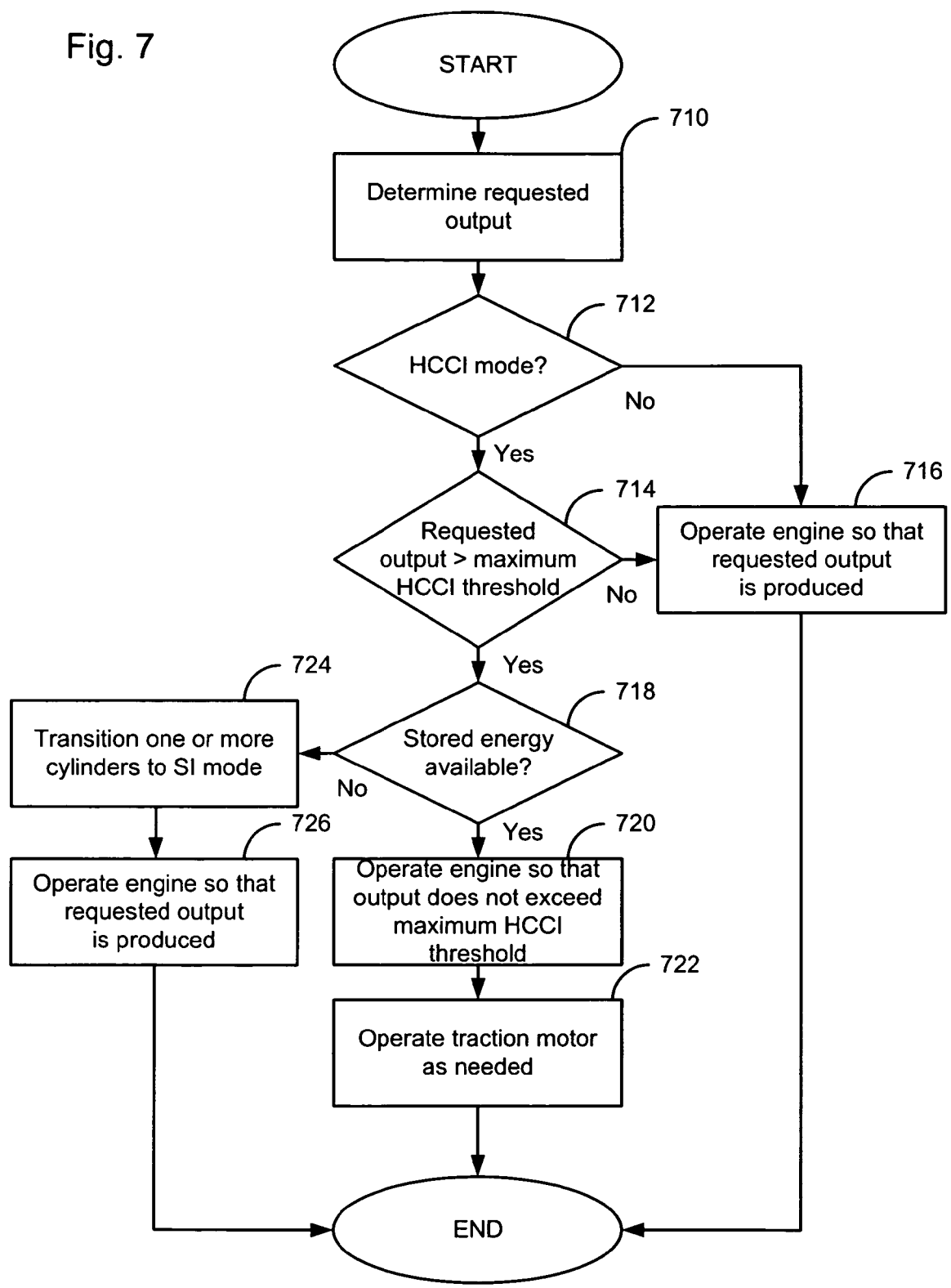

Referring now to FIG. 7, an example routine for controlling the hybrid propulsion system is shown. Beginning at 710 a requested output may be determined. The requested output may include a requested torque, speed and/or power among others. Further, the requested output may be determined by pedal position or other control methods and may include input from the engine controller and/or driver. Next, at 712 it is judged whether the engine is operating in an HCCI mode. If the answer at 712 is yes, the routine proceeds to 714. Alternatively, if the answer at 712 is no, the routine proceeds to 716. At 714 it is judged whether the requested output is greater than the upper HCCI threshold as described above with reference to FIG. 3. If the answer at 714 is yes, the routine proceeds to 718. Alternatively, if the answer at 714 is no, the routine proceeds to 716. At 716 the engine is operated so that the requested output is produced. Next, the routine ends.

Returning to 718, it is judged whether stored energy is available to operate the traction motor to produce the desired output. If the answer is yes, the routine proceeds to 720. Alternatively, if the answer at 718 is no, the routine proceeds to 724. At 724 one or more cylinders of the engine may be transitioned to SI mode, however any mode may be used that is capable of producing the requested output. For example, the engine may transition to a spark assist mode instead of SI mode. Next, at 726 the engine is operated to produce the requested wheel output. Next, the routine ends. Returning to 720, the engine produces an output that is less than or equal to the upper HCCI threshold as shown in FIG. 3. Next, at 722, an output is supplied by the traction motor to provide at least a portion of the wheel output. In this manner, the engine may be operated in an HCCI mode even when the wheel output is greater than the upper HCCI threshold. In this manner, the motor can be used to supply a portion of the wheel output, thereby enabling the engine to remain in HCCI mode even when the requested output is greater than the maximum HCCI threshold.

Figure 8:
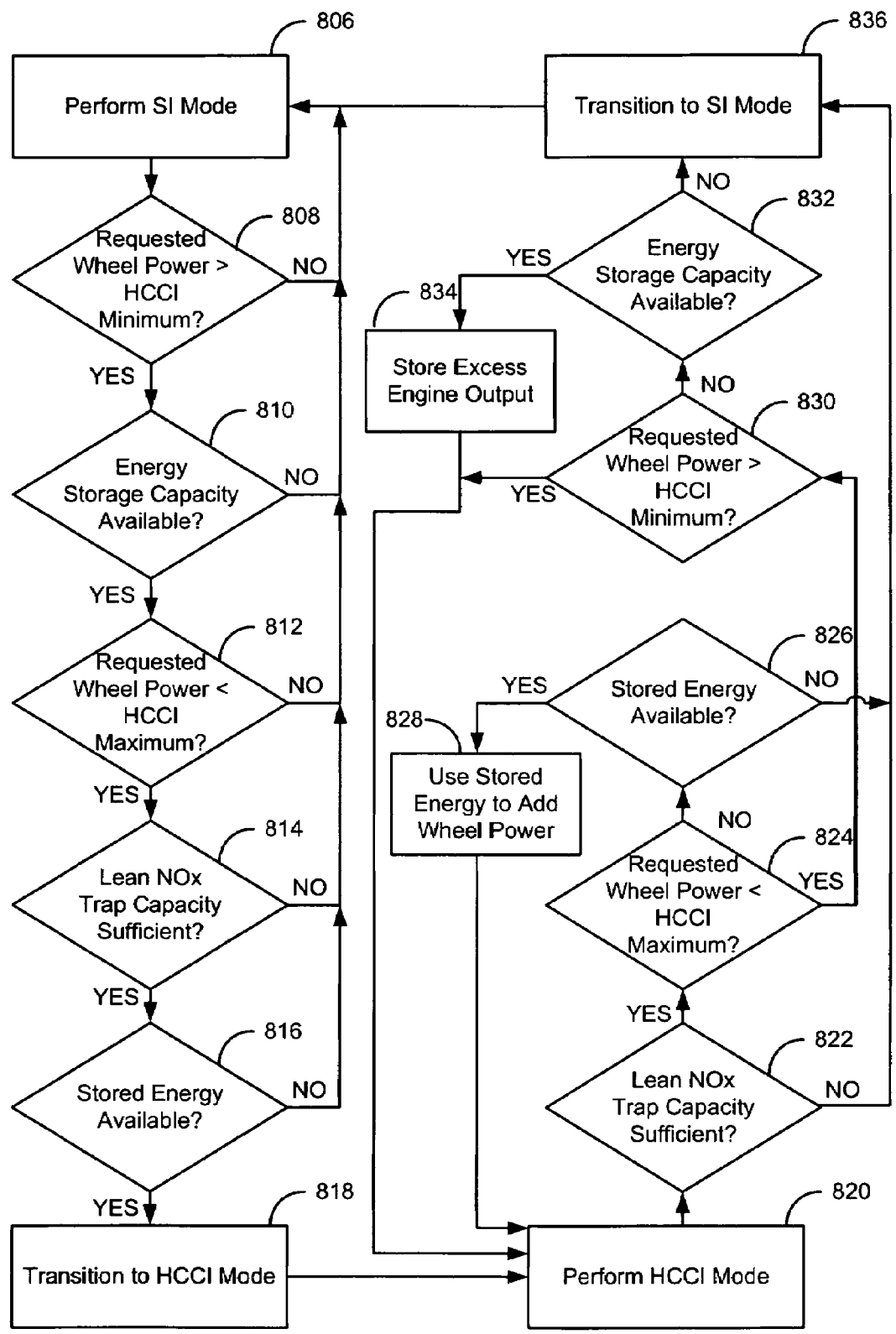
FIGS. 8 and 9 are flow charts showing an example routine for controlling an engine configured in a hybrid propulsion system while consider purging of the lean NOx trap and the state of charge of the energy storage device.

Referring now to FIG. 8, an example routine for controlling transitions between combustion modes is shown. Specifically, the routine described herein seeks to manage and reduce overall transitions between combustion modes while utilizing the energy storage device to supply additional energy to the drive wheels as needed. Further, the routine also takes into account the periodic purging of the lean NOx trap and the limited energy storage capacity.

Beginning at 806, SI mode is performed. For example, in some embodiments, the routine may default to SI mode such as during engine start-up among others. However, in some embodiments, the routine may begin in HCCI mode or another combustion mode. Next, the routine proceeds to 808, where it is judged whether the requested wheel output is greater than the HCCI minimum threshold. If the answer is no, the routine returns to 806 where SI mode is performed. Alternatively, if the answer is yes, the routine proceeds to 810 where it is judged whether energy storage capacity is available in the energy storage device. If the answer is no, the routine returns to 806. Alternatively, if the answer is yes, the routine proceeds to 812, where it is judged whether the requested wheel output is less than the HCCI maximum threshold as described above with reference to FIG. 3. If the answer is no, the routine returns to 806. Alternatively, if the answer at 812 is yes, the routine proceeds to 814. At 814 it is judged whether the lean NOx trap capacity is sufficient (i.e. does not require imminent purging).

In some embodiments, the engine controller may be configured to estimate the condition of the lean NOx trap based on past, current, and/or future predicted engine operating conditions. In some embodiments, a threshold may be set where if the estimated condition of the lean NOx trap is below a threshold (i.e. insufficient) the routine will return to 806 where SI mode is performed and the lean NOx trap can be purged by temporarily operating the engine rich. If the answer at 814 is no, the routine returns to 806. Alternatively, if the answer at 814 is yes, the routine proceeds to 816. At 816 it is judged whether a sufficient amount of stored energy is available to provide a supplemental output if needed. If the answer at 816 is no, the routine returns to 806. Alternatively, if the answer at 816 is yes, the routine proceeds to 818 where a transition to HCCI mode may be performed. In some embodiments, the amount of stored energy required may depend on the current engine operating conditions and/or predicted engine operating conditions, among others.

In some embodiments, before an engine transitions to HCCI mode, the controller may be configured to operate the engine so that a purge of the lean NOx trap is performed. Thus, the subsequent operation in HCCI mode can be extended before another purge of the lean NOx trap is requested. Also in some embodiments, before an engine transitions to HCCI mode, the controller may be configured to operate the engine so that additional energy is added to or removed from the storage device, to prepare for future HCCI operation. At 818 the engine may perform a transition from SI mode to HCCI mode, which may include the adjustment of engine operating conditions. Next, at 820 the engine operates in HCCI mode such that the engine output remains within the HCCI operating region described above with reference to FIG. 3. Next, at 822 it is judged whether the lean NOx trap capacity is sufficient. If the answer at 822 is no, the routine proceeds to 836 where a transition to SI mode is performed and the lean NOx trap may be purged. Alternatively, if the answer at 822 is yes, the routine proceeds to 824. At 824 it is judged whether the requested wheel power is less than the HCCI maximum threshold. If the answer at 824 is yes, the routine proceeds to 830. Alternatively, if the answer at 824 is no, the routine proceeds to 826. At 826 it is judged whether a sufficient amount of stored energy is available to produce a supplementary output as needed. If the answer at 826 is yes, the routine proceeds to 828. At 828 the stored energy is used to add wheel power. Thus, when the requested wheel power is greater than HCCI threshold, the engine may remain in HCCI mode since the stored energy is being converted to wheel power by the traction motor. Next, the routine returns to 820. Alternatively, if the answer at 826 is no, the routine proceeds to 836. At 830 it is judged whether the wheel power is greater than the HCCI minimum threshold. If the answer is yes, the routine returns to 820, where HCCI mode is performed. Alternatively, if the answer is no, the routine proceeds to 832. At 832 it judged whether the energy storage device has sufficient energy storage capacity to absorb excess engine output. If the answer is yes, the routine proceeds to step 834, where the excess engine output is absorbed by the battery via the energy conversion device and/or motor. Alternatively, if the answer is no, the routine proceeds to 836, where the engine performs a transition from HCCI mode to SI mode. Next, at 806, the engine operates in SI mode.

FIG. 8 shows just one example method for controlling engine transitions. In some embodiments, the routine may include more than two combustion modes. For example a spark assist mode may be used to facilitate transitions between combustion modes, or some cylinders may operate in HCCI mode while others are operating in SI mode. In some embodiments, 816 may be bypassed if it is judged that the conditions are suitable for operation in HCCI mode even though there is insufficient stored energy. Further, under some conditions, portions of the routine described in FIG. 8 may be discontinued at any time during operation of the vehicle if it is judged desirable to do so.

Figure 9:
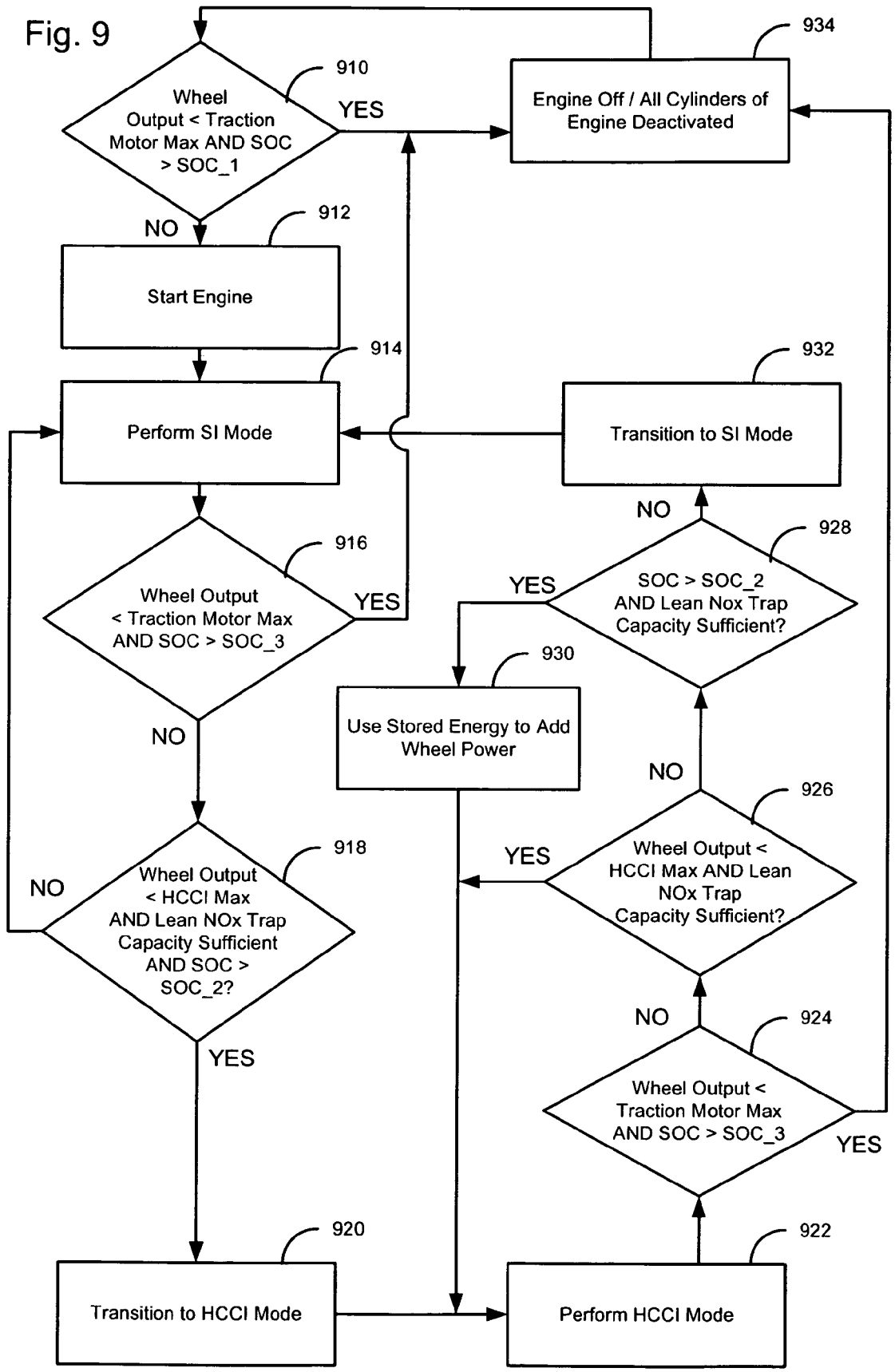

Referring now to FIG. 9, an example routine is shown, which controls transitions between combustion modes, while maximizing engine shut-off time. Specifically, the routine described herein seeks to minimize transitions between combustion modes while utilizing the energy storage device and the traction motor to supply additional output to the drive wheels as needed. Further, the routine takes into account the periodic purging of the lean NOx trap and the state of charge (SOC) of the energy storage device. As described below, the routine shown in FIG. 9 uses three SOC levels for determining a variety of operations; however a different number of levels may be used. For example, SOC_1 represents the minimum SOC for keeping the engine off or deactivated. As described herein, an engine that is off may include deactivation of all of the engine cylinders and the engine crank shaft may be stopped from rotating. As described above with reference to FIG. 1B, the engine may rotate to a suitable position to facilitate restarting of the engine prior to shutting off. On the other hand, an engine that is deactivated may include the deactivation of all of the engine cylinders (for at least one cycle); however, the engine may continue to rotate. Further, SOC_2 represents the minimum SOC for using the traction motor to facilitate transitions between combustion modes and/or cylinder activation/deactivation configurations, and SOC_3 represents the minimum SOC to turn the engine off or deactivate the engine. Thus, in this example routine, SOC_3 is greater than SOC_1, which therefore reduces the number of transitions between engine being off or deactivated, and the engine being on (at least one cylinder operating).

Beginning at 910, it is determined whether the operating conditions are suitable for starting the engine. For example, the engine may be deactivated while the traction motor provides the requested wheel output. If the requested wheel output is less than the maximum output of the traction motor and the current SOC of the energy storage device is greater than a first state of charge criteria (SOC_1) then the engine may remain off or deactivated. Alternatively, if the answer is no, the engine can be started, which may include supplying fuel to one or more of the engine cylinders to achieve combustion. At 914 the engine is operated in the SI mode, however in some examples, such as where the engine is sufficiently warm, the engine may be started in HCCI mode.

If SI mode is performed, the routine compares the wheel output to the traction motor maximum output and compares the SOC of the energy storage device to a third state of charge criteria (SOC_3) as shown in 916. Note, in this example SOC_3 represents the minimum SOC to turn the engine off. If these conditions are met, the engine is turned off. Alternatively, if the conditions of 916 are not met, then the routine compares the wheel output to the upper HCCI threshold, checks the lean NOx trap capacity to make sure that a purge is not necessary, and compares the SOC of the energy storage device to a second state of charge criteria (SOC_2), as shown in 918. If the conditions of 918 are not met, the engine may continue operating in SI mode (914). Alternatively, if the conditions of 918 are met, the engine may transition to HCCI mode (920) and operate in HCCI mode (922).

While operating in HCCI mode, the wheel output can be continuously compared to the maximum output of the traction motor and as well as comparing the SOC of the energy storage device to SOC_3 (924). If the conditions of 924 are met, the engine can be shut off or deactivated (934). Alternatively, if the conditions of 924 are not met, a comparison of the wheel output and the maximum HCCI output can be made, and the lean NOx trap capacity can be checked (926). If the conditions of 926 are met, the engine may continue operating in HCCI mode (922). Alternatively, if the conditions of 926 are not met, a comparison of the SOC of the energy storage device to the SOC_2 can be made, and the condition of the lean NOx trap is considered. If the conditions of 928 are met, stored energy can be converted by the traction motor to add to wheel power (930). Thus, through the addition of output by the traction motor, the engine may remain in HCCI mode and avoid a transition to SI mode. Alternatively, if the conditions of 928 are not met, the engine can transition to SI mode (932) and operate in SI mode (914). In some examples, the engine may transition one or more cylinders to SI mode, thus minimizing the number of cylinders to be transitioned.

Figure 10:
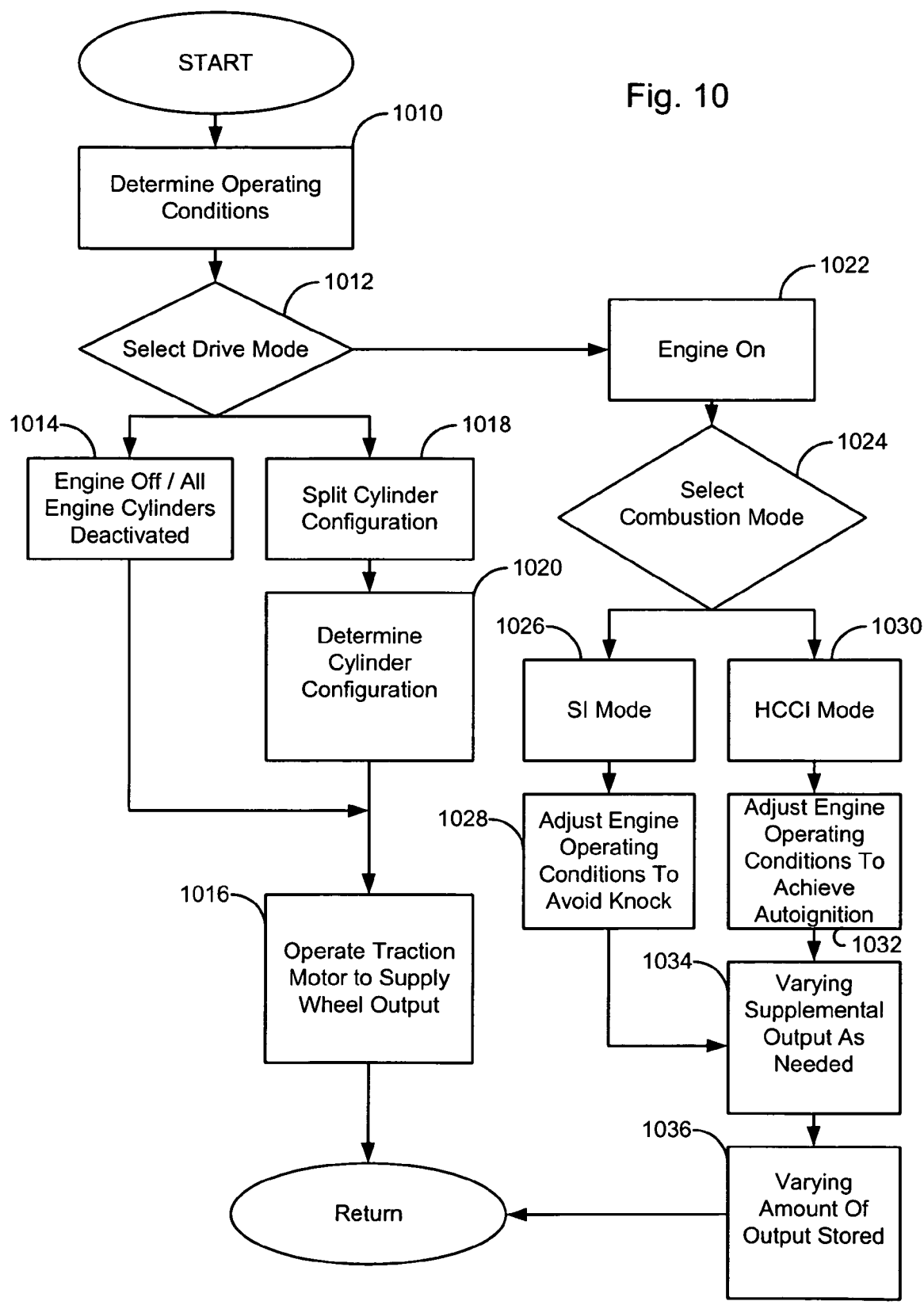
FIG. 10 is a flow chart showing an example routine for controlling the vehicle propulsion system for various engine configurations.

Referring now to FIG. 10, an example routine for controlling operation of the hybrid propulsion system is shown. The routine includes determining operating conditions of the engine and/or hybrid propulsion system (1010) before selecting a drive mode (1012). As described above, the hybrid propulsion system can operate with the engine off or all cylinders deactivated (1014) wherein the traction motor provides the requested wheel output (1016). Further, the hybrid propulsion system can operate with the engine in a split cylinder configuration (1018), as further shown in FIG. 11, wherein at least one of the cylinders operates in one of a deactivated mode, SI mode or HCCI mode, and at least another cylinder operates in a different one of a deactivated mode, SI mode or HCCI mode. For example, an engine having a plurality of cylinders can operate with at least one cylinder deactivated and/or at least one cylinder operating in HCCI mode and/or at least one cylinder operating in SI mode.

Further, the hybrid propulsion system can operate with all of the cylinders of the engine operating in one of SI mode and HCCI mode (1022) wherein a combustion mode is selected (1024) based at least partially upon the engine operating conditions. If an SI mode is selected (1026), the engine operating conditions can be adjusted to avoid or reduce engine knock (1028). Alternatively, if HCCI mode is selected (1030), the engine operating conditions can be adjusted to achieve and control a timing of autoignition. Finally, the hybrid propulsion system can be used to supply energy (1034) and/or absorb and store energy (1036) so that the selected mode is maintained, at least under some operating conditions.

Figure 11:
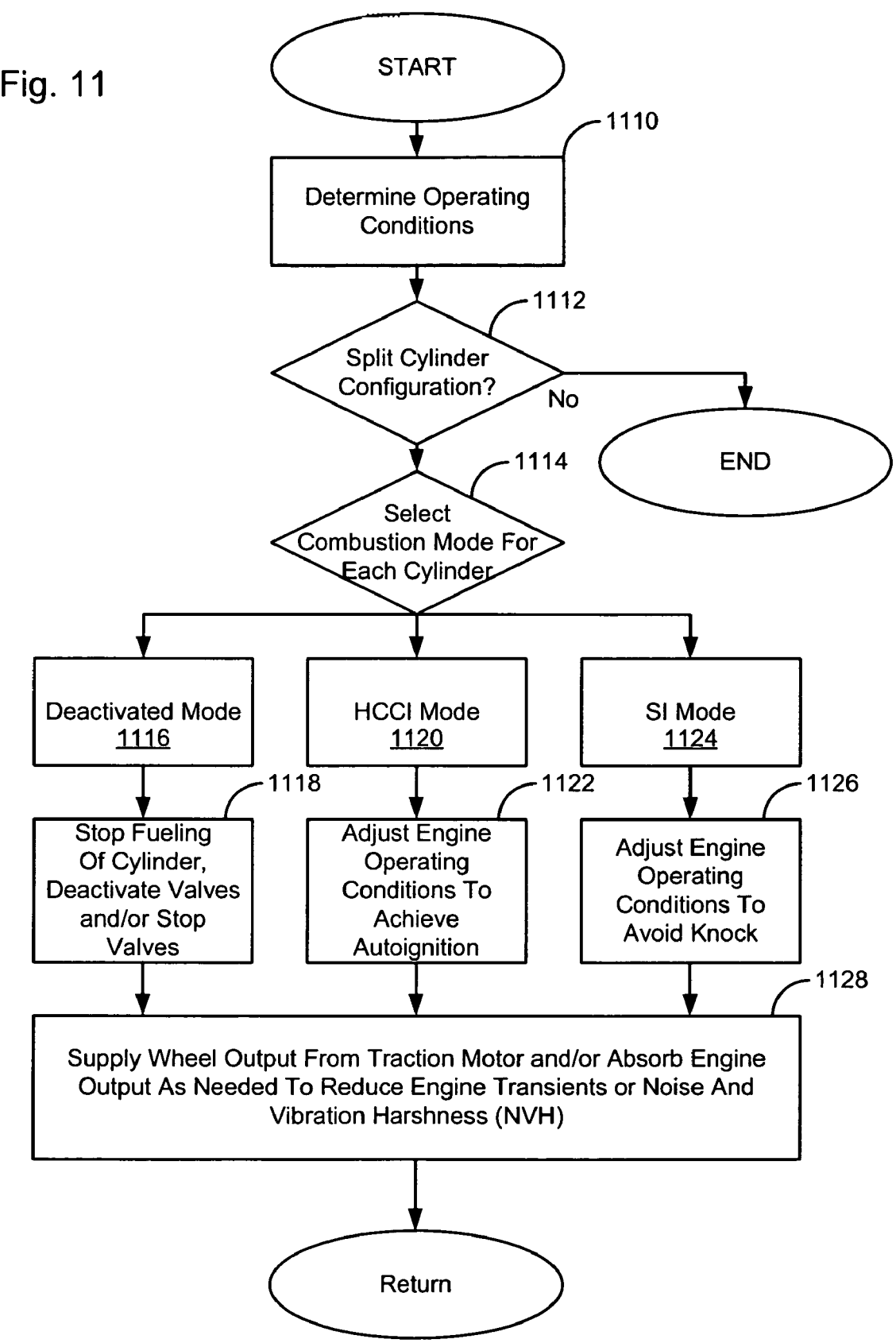
FIG. 11 is a flow chart showing an example routine for selecting and controlling combustion modes for individual engine cylinders.

Referring now to FIG. 11, a flow chart is shown for controlling the split cylinder configuration described above with reference to FIG. 10. Beginning at 1110, operating conditions are determined and if a split cylinder configuration is selected (1112) a combustion mode for each cylinder is selected (114). Alternatively, if a split cylinder configuration is not chosen (1112), the routine ends. As described above, the engine may be configured to concurrently operate in plurality of combustion modes. Thus, if the split cylinder configuration is selected, each cylinder or group of cylinders may be selected to operate in a different combustion mode.

A deactivated cylinder mode (1116) includes deactivating the cylinder using one of two methods. A first method may include stopping the fueling of the cylinder (1118) for one or more cycles, wherein at least some of the intake and exhaust valves continue to operate, but combustion does not occur within the deactivated cylinder. Thus, air may still pass through the deactivated cylinder. A second method may include both stopping the fueling of the cylinder (1118) and stopping each of the intake and/or exhaust valves (1119). Further, each of the intake and/or exhaust valves may be stopped in a fully open position, a fully closed position, or in between fully open and fully closed. When each of the intake and/or exhaust valves are in a closed position, airflow through the cylinder can be reduced or inhibited.

An HCCI mode (1120) may include adjusting at least an operating condition of the engine to achieve autoignition of an air and fuel mixture without performing a spark from a sparking device (1122) for the particular cylinder operating in the HCCI mode. Similarly, an SI mode (1124) may include adjusting at least an operating condition to avoid engine knock, which may include reducing intake air temperature, adjusting spark timing, reducing EGR contribution, etc. Finally, at 1128 the hybrid propulsion system may be used to produce an output from the traction motor and/or convert and store engine output as needed to reduce noise and vibration harshness (NVH) or other transients caused by the engine.

Figure 12:
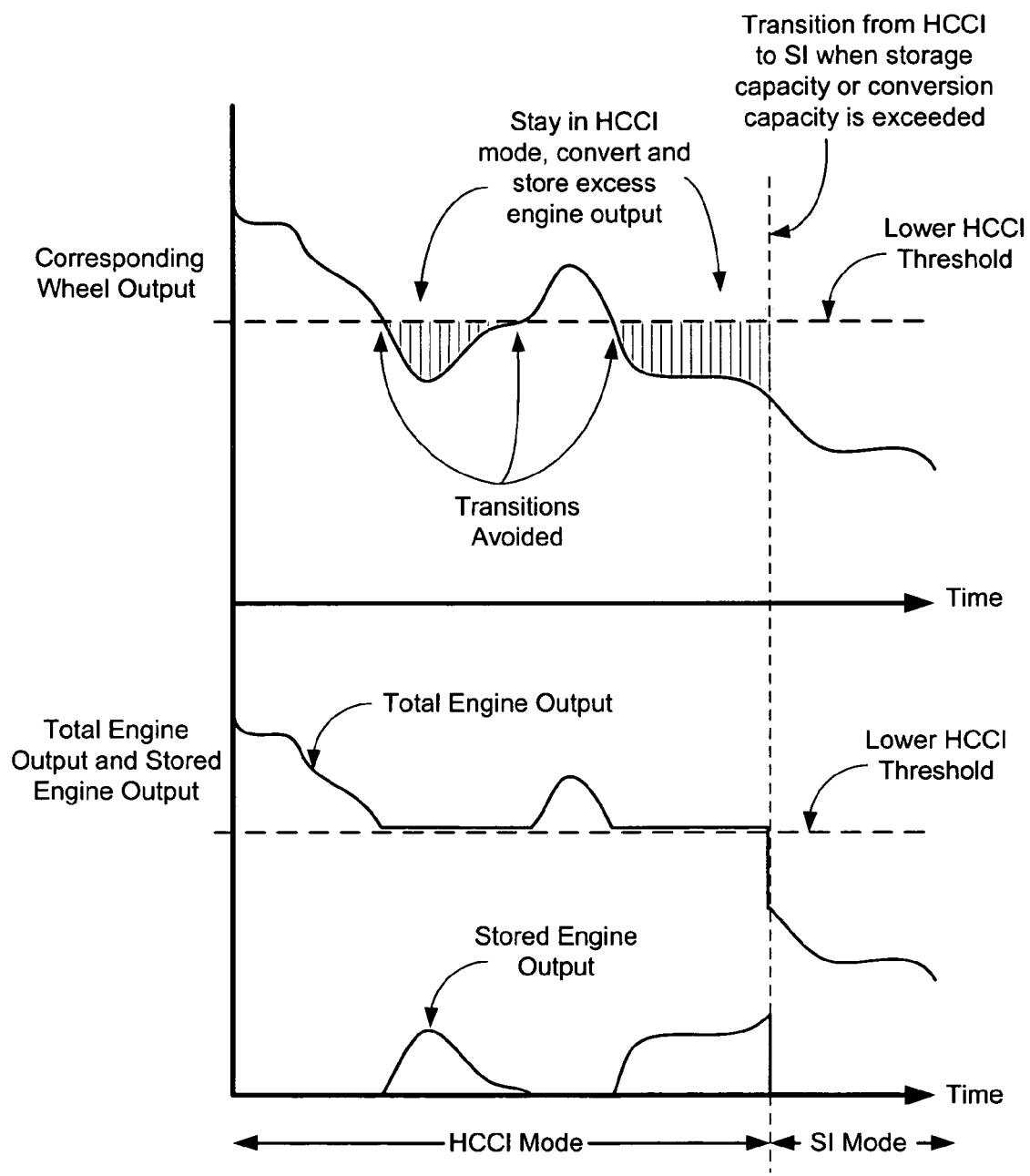
FIGS. 12 and 13 show example applications of the control routines described herein.

Referring now to FIG. 12, a graph illustrating an example application of the engine control routine of FIG. 6 is shown. The graph of FIG. 12 shows time (horizontal axis) compared to wheel output, engine output, and stored engine output (vertical axis). Beginning at the left end of the horizontal time axis, the engine is shown to be initially operating in an HCCI mode wherein the engine output produces substantially all of the wheel output. As time progresses (moves to the right along the horizontal time axis), the wheel output and therefore the engine output are shown to decrease toward the lower HCCI threshold. As the engine output and wheel output approach the lower HCCI threshold, the engine output may be controlled so that it maintains an output at or above the lower HCCI threshold. In some embodiments, the engine output may be restricted to produce more output than the lower HCCI threshold by a factor of safety to further ensure reliable HCCI operation. As the wheel output continues beneath the lower HCCI threshold, the excess output produced by the engine may be absorbed by the energy storage device (shown by the shaded region). Therefore, a transition from HCCI mode to SI mode can be avoided by operating the engine at or above the lower HCCI threshold while utilizing the hybrid propulsion system to absorb the excess engine output.

As the wheel output begins to increase, the engine output absorbed by the energy storage device may decrease accordingly. As the wheel output increases above the lower HCCI threshold, the engine output may be adjusted concurrently with the wheel output while the energy storage device ceases to receive energy from the engine output. However, in some embodiments, the energy storage device may receive energy from the engine output even when the wheel power is greater than the lower HCCI threshold. In other words, the energy storage device may be charged, when desired, at any time during engine operations so that the energy storage device contains a sufficient amount of stored energy or minimum state of charge. Similarly, the energy storage device may be discharged by supplementing engine output when wheel output is above the lower HCCI threshold, thus maintaining a desired SOC.

As the wheel output once again falls beneath the lower HCCI threshold, the amount of engine output or energy absorbed by the energy storage device may be increased accordingly. Next, the engine is shown by the vertical broken line to transition to SI mode. This transition may occur when storage capacity and/or conversion capacity is exceeded, among other factors. For example, the energy storage device may have a limited storage capacity at which it is unable to store additional energy. In another example, the energy storage device may not be able to absorb the engine output at a sufficient rate to maintain HCCI mode. Further, a transition to SI mode may be performed when a purge of the lean NOx trap is desired. Thus, when either the energy storage capacity and/or the energy conversion capacity are exceeded, the engine may transition from HCCI mode to SI mode or another desired combustion mode. As the engine transitions from HCCI mode to SI mode, the energy absorbed by the energy storage device may be decreased concurrently with the decrease in engine output so that the requested wheel output is achieved.

In some examples, the engine may deactivate one or more cylinders and/or transition one or more cylinders between combustion modes to remain at least partially in HCCI mode. For example, if the energy storage device has reached a state where it can no longer absorb some or all of the excess output produced by the engine, some of the engine cylinders may be deactivated so that the total engine output is reduced. Thus, the resulting change in engine displacement can facilitate the reduction of engine output while remaining in HCCI mode. In some embodiments, both cylinder deactivation and operating the energy conversation device and energy storage device to absorb the excess engine output may be used. In another example, some of the cylinders may be transitioned to SI mode allowing a reduced engine output from the SI cylinders, thus reducing the total engine output while enabling at least some cylinders to remain in HCCI mode. In some examples, the split cylinder configuration wherein some cylinders are operated in SI mode and/or HCCI mode and/or a deactivated mode can be used in conjunction with absorbing excess engine output with the energy storage device to provide increased efficiency and reduced NOx production.

Continuing with FIG. 12, although the engine output and stored engine output is shown to abruptly decrease as the transition is performed, in some embodiments, the engine output may be adjusted slowly (i.e. over a plurality of engine cycles) while either supplying or absorbing engine output as necessary with the hybrid system. As the transition to SI mode is completed, the engine operating in SI mode can produce an output approximately equal to the wheel output if desired. However, in some embodiments, the engine may produce excess output in order to charge the energy storage device under certain conditions, or wheel output may be supplied from stored energy to maintain a desired SOC in the energy storage device under other conditions. It should be appreciated that FIG. 12 shows just one non-limiting example application of the control strategies disclosed in herein, as other applications are possible.

Figure 13:
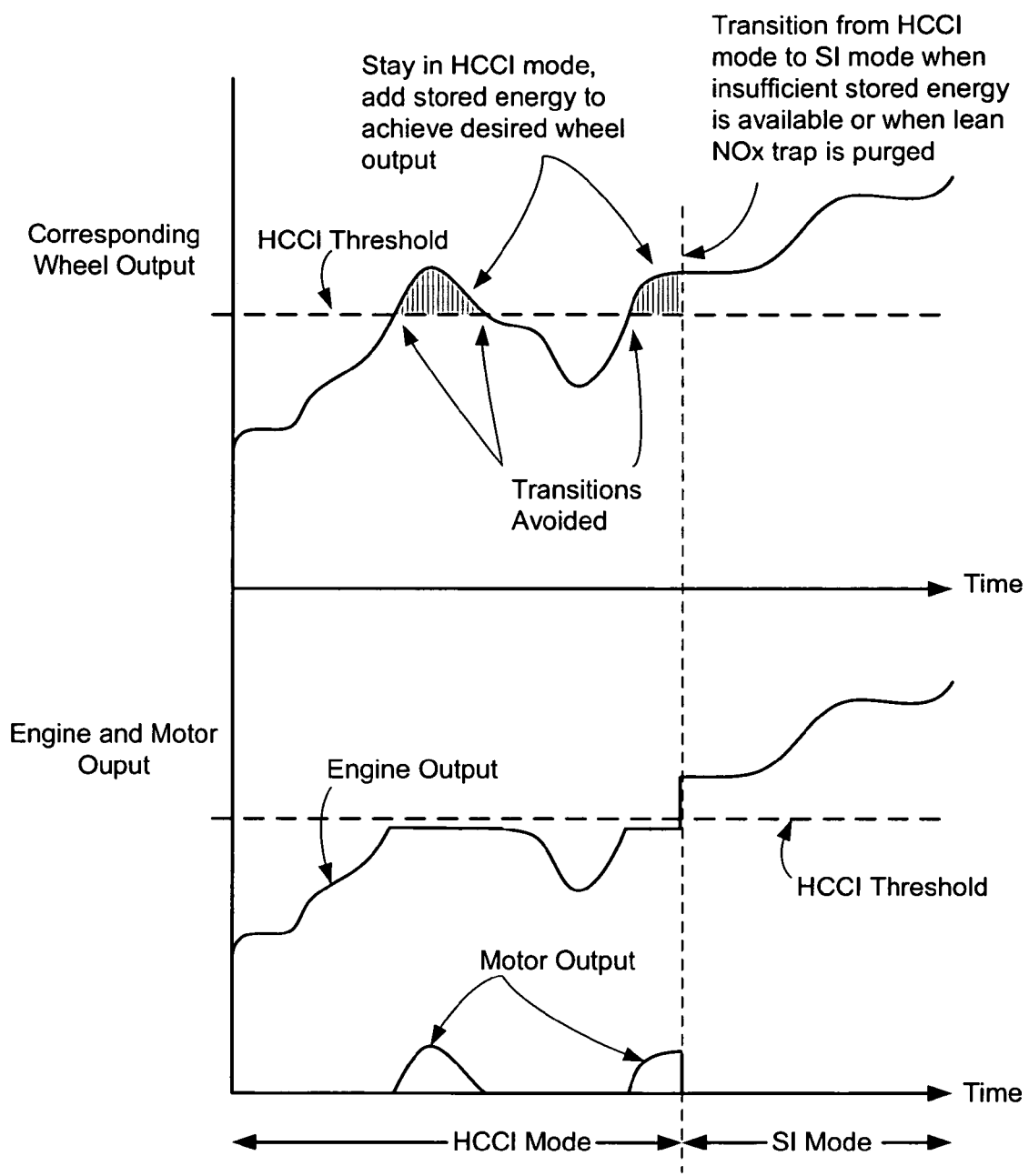

Referring now to FIG. 13, a graph illustrating an example application of the engine control routine of FIG. 7 is shown. The graph of FIG. 13 shows time (horizontal axis) compared to wheel output, engine output, and traction motor output (vertical axis). Beginning at the left end of the horizontal axis the engine is shown to be initially operating in an HCCI mode wherein the engine output produces substantially all of the wheel output. As time progresses, the wheel output and engine output are shown to increase concurrently toward the HCCI threshold. As the engine output and wheel output approach the HCCI threshold, the engine output can level off at or below the HCCI threshold. In some embodiments, the engine operating in HCCI mode may have an output that is restricted to less than the HCCI threshold by a factor of safety so that reliable HCCI combustion is maintained. As the wheel output continues above the HCCI threshold, the traction motor output, as powered by the energy storage device, can be increased concurrently so that the requested wheel output is maintained. Therefore, a transition from HCCI mode to SI mode has been avoided by converting stored energy to wheel output through use of the traction motor.

As wheel output begins to decrease, the traction motor output may be decreased accordingly. As the wheel output passes below the HCCI threshold, the traction motor output may be reduced or stopped and the engine output may be adjusted concurrently with the wheel output. However, in some examples, the engine may continue to operate at a constant output while the hybrid system supplies and/or absorbs output as necessary. As the wheel output once again exceeds the HCCI threshold, the traction motor output may be increased concurrently. Next, as shown by the vertical broken line, the engine can transition one or more cylinders to SI mode. This transition may occur when insufficient stored energy is available to produce the requested wheel output, when a purge of the lean NOx trap is requested and/or when greater efficiency may be gained. As the engine transitions from HCCI mode to SI mode, the traction motor output can be decreased if desired while the engine output can be increased so that the requested wheel output is achieved. Although the traction motor output is shown in FIG. 13 to abruptly decrease and the engine output is shown to abruptly increase when the transition is performed, in some embodiments the motor output and engine output may be adjusted slowly (i.e. over a plurality of engine cycles) so that the engine operating conditions may be adjusted. As the transition of one or more cylinders to SI mode is completed, the engine can once again supply substantially all of the wheel power, if desired. However, in some embodiments, the traction motor output may be used in conjunction with the engine output as desired. FIG. 13 is just one non-limiting example application of the control routine described in FIG. 7 as other control strategies are possible.

Figure 14:
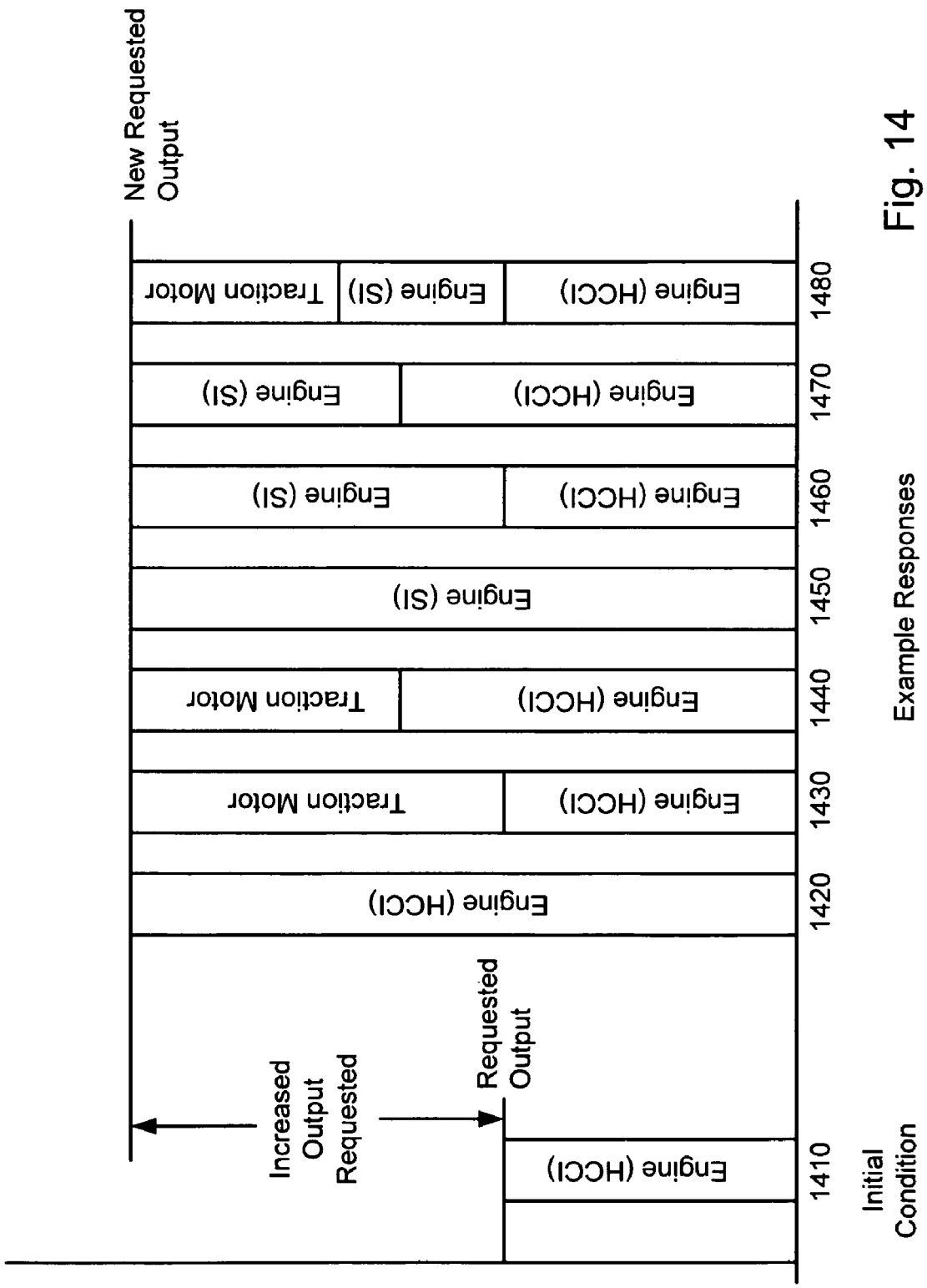
FIGS. 14-17 show example responses to a change in requested wheel output.
Figure 15:
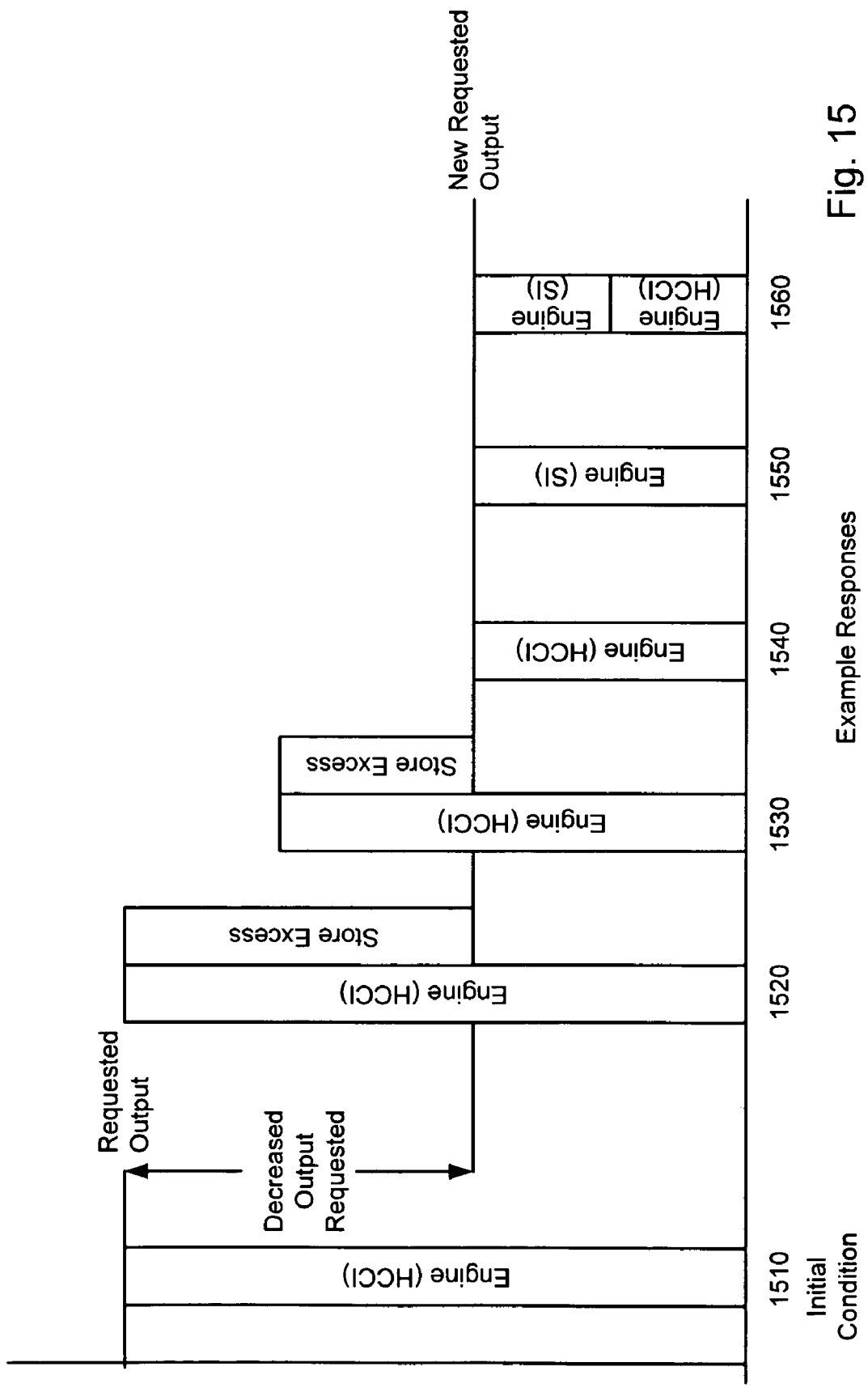

The application of a hybrid vehicle propulsion system having an engine that can operate in a plurality of combustion modes and/or cylinder configurations can provide substantial benefits such as improved fuel efficiency and/or reduced NOx production among others. FIGS. 14 and 15 show example scenarios where a change in the requested wheel output can include a variety of responses depending on operating conditions.

Referring now to FIG. 14, an example scenario is provided wherein the engine is initially operating with all cylinders in an HCCI mode 1410. However, it should be appreciated that in some examples, the engine may be operating with one or more of the cylinders deactivated and one or more of the cylinders operating in the HCCI mode and/or SI mode. As shown at initial condition 1410, the engine operating in HCCI mode can be producing all of the requested wheel output. As the requested output is increased, denoted as "new requested output", a variety of responses (1420-1480) are possible. For example, the hybrid propulsion system may be configured to respond by increasing the engine output in HCCI mode. Thus, in response 1420 a transition between combustion modes would not be required. In an example where the engine is initially operating with one or more cylinders deactivated, response 1420 may include increasing the number of cylinders active in HCCI mode. For example, if a four cylinder engine is operating with two cylinders in HCCI mode and two cylinders deactivated, one or more of the deactivated cylinders could be activated in HCCI mode to provide the additional output.

Alternatively, in some examples, response 1430 may be used wherein the engine operating in HCCI mode remains at steady state (i.e. producing substantially the same output). The remaining requested output may be supplied by the traction motor. Therefore, in some embodiments, the engine can be operated at a steady state mode corresponding to the most efficient operating state of the engine for the particular combustion mode utilized. Alternatively, response 1440 could be used, wherein the traction motor supplies some of the requested output and the engine operating in HCCI mode supplies some of the requested output. Thus, the engine operating in HCCI mode may be increased and the traction motor may be used to provide the total requested output. Again, deactivated cylinders may be activated as desired to supply the requested engine output while remaining in HCCI mode.

Alternatively, as shown by response 1450, the engine may transition from HCCI mode to SI mode with the engine producing substantially all of the requested output. In some embodiments, when the engine is operating with some of the cylinders activated in HCCI mode and some of the cylinders are deactivated, one or more of the active or deactivated cylinders may transition to SI mode as shown in response 1460. Again, it should be noted that this may be accomplished by allowing the HCCI cylinders to vary with requested output or operating the HCCI cylinders at a substantially steady state output, while using one or more cylinders operating in SI mode to track the changes and/or transient variations in requested output as shown with regards to response 1470. Alternatively, as shown with reference to response 1480, one or more of the cylinders may remain operating in HCCI mode at steady state, while one or more of the cylinders are operated in SI mode in conjunction with supplemental output supplied by the traction motor.

While FIG. 14 shows just some examples of possible responses to an increase in requested output, it should be appreciated that variations of those shown in FIG. 14 may exist. For example, in each of the responses, the engine and/or traction motor may supply more output than is requested by the driver wherein the excess output can be stored by the energy storage device for later use. Furthermore, each of the responses shown in FIG. 14 may seek to maximize efficiency when determining whether to operate the engine in HCCI mode at a steady state output, whether to activate deactivated cylinders, and/or whether to transition one or more cylinders to a different combustion mode, and/or whether to supply supplemental output from the traction motor. Finally, in some embodiments, all cylinders of the engine may be deactivated or the engine shut-off, while supplying all of the requested output from the traction motor.

Referring now to FIG. 15, an example scenario is provided wherein the engine is initially operating with one or more cylinders in HCCI mode 1510. FIG. 15 shows a decrease in the requested output as "new requested output" and a variety of possible responses 1520-1560. In some examples, response 1520 may include the engine continuing in HCCI mode producing the same output as shown in initial condition 1510. The excess output produced by the engine may be converted by the energy conversion device and stored by the energy storage device. Thus, the engine may operate at substantially steady state. Response 1530 shows how the engine operating in HCCI mode can reduce output while storing some of the excess energy. For example, if the requested output is decreased below the minimum HCCI threshold, the engine may reduce output to just above the HCCI threshold so that the engine may remain in HCCI mode. Alternatively, response 1540 may be used, wherein the output of the engine operating in HCCI mode supplies the requested output and no energy is stored by the energy storage device. In some embodiments, a reduction in engine output may be accomplished through deactivating one or more cylinders, thus decreasing the engine displacement and overall maximum output. Thus, some of the cylinders operating in HCCI mode may remain in steady state, while reducing the total engine output through deactivating one or more cylinders.

Further, response 1550 is shown wherein the engine can transition all of the cylinders from HCCI mode to SI mode. Alternatively, in some conditions, the engine may transition between combustion modes while activating and/or deactivating one or more cylinders, as shown by response 1560. For example, an engine operating with four cylinders activated in HCCI mode may transition three of the cylinders to SI mode and deactivate one of the cylinders, if desired. While FIG. 15 shows several example responses to a decrease in requested output, other responses are possible. For example, the engine may be deactivated (i.e. supply no output to the drivetrain) so that only the traction motor (such as an electric traction motor or hydraulic motor, etc.) supplies substantially all of the output to the drivetrain.

Figure 16:
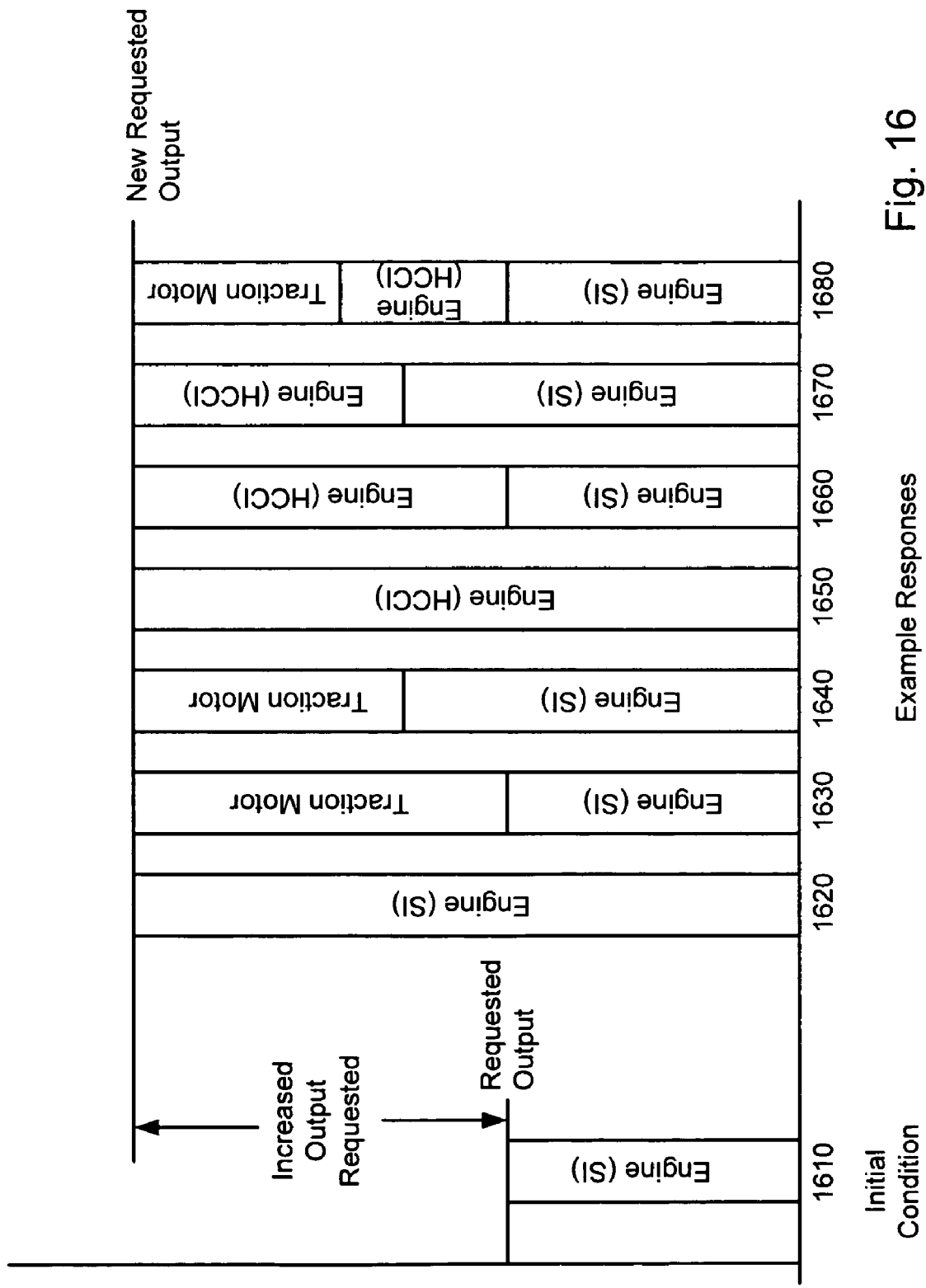

Referring now to FIG. 16, an example scenario is provided wherein the engine is initially operating with one or more cylinders in SI mode 1610. FIG. 16 shows an increase in the requested output as "new requested output" and a variety of possible responses 1620-1680. In some examples, response 1620 may include the engine continuing in SI mode where the engine output is increased to supply the requested wheel output. Response 1630 shows how the engine can continue at the same output in SI mode, while the traction motor can be used to supply additional wheel output to meet the requested wheel output. Alternatively, response 1640 may be used, wherein the output of the engine operating in SI mode is increased and the motor is operated to supplement the engine output. As shown in response 1650, the engine may transition all of the engine cylinders to HCCI mode if the increase in requested wheel output is within the HCCI operating region. Alternatively, as shown in responses 1660 and 1670, the engine may transition one or more of the combustion cylinders to HCCI mode. Response 1660 shows such transition where the cylinders operating in SI remain in substantially steady state from 1610, while response 1670 shows the SI cylinders producing a greater output than shown in 1610. Alternatively, response 1680 shows the engine operating with at least one cylinder operating in each of SI mode and HCCI mode, and the motor is used to produce additional wheel output. In some embodiments, an increase in engine output may be accomplished by activating one or more cylinders, thus increasing the engine displacement and overall maximum output. Thus, some of the cylinders operating in SI mode may remain in steady state, while increasing the total engine output through activating one or more cylinders in SI mode, HCCI mode, or other combustion mode.

Figure 17:
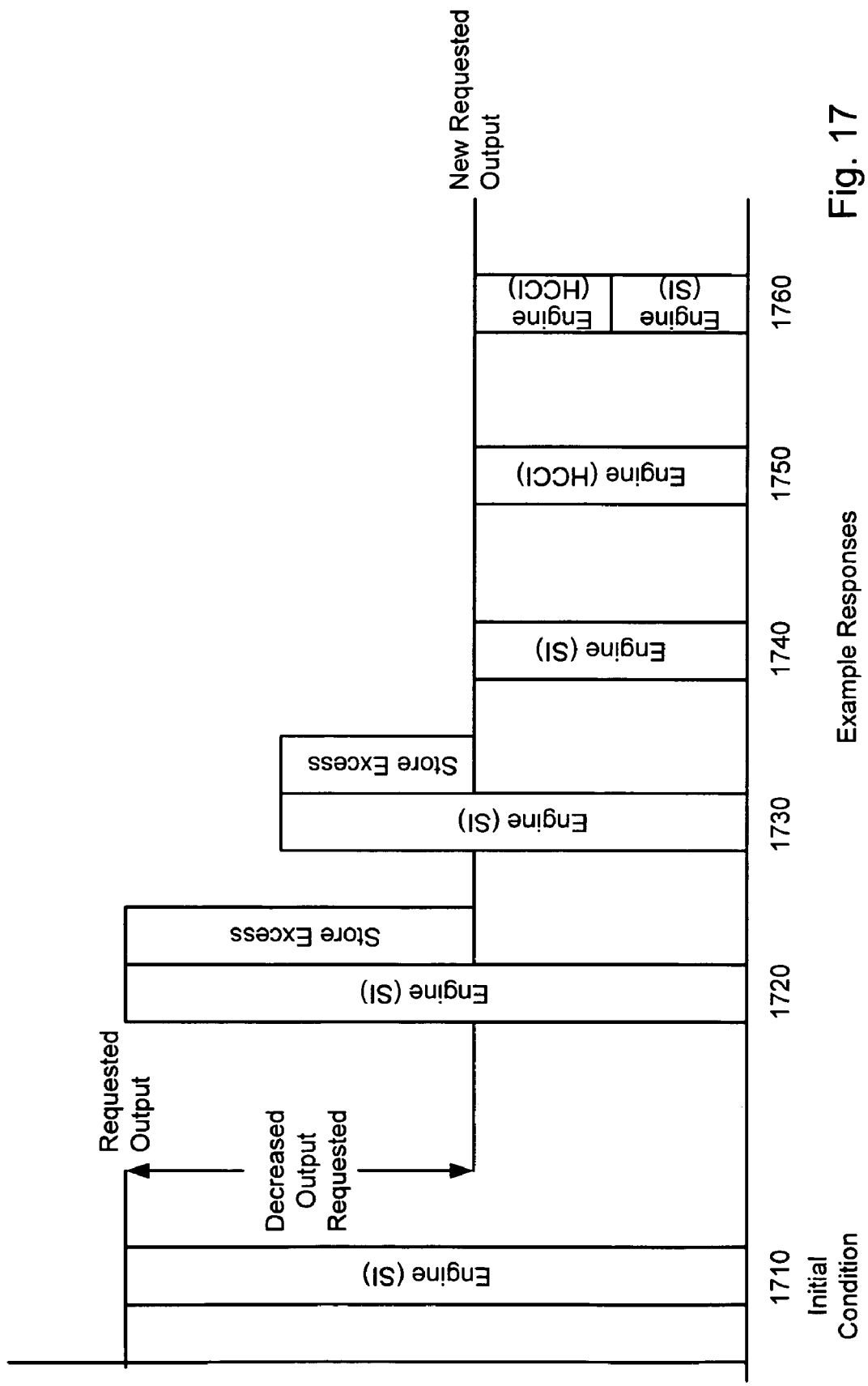

Referring now to FIG. 17, an example scenario is provided wherein the engine is initially operating with one or more cylinders in SI mode 1710. FIG. 17 shows a decrease in the requested output as "new requested output" and a variety of possible responses 1720-1760. In some examples, response 1720 may include the engine continuing in SI mode producing the same output as shown in initial condition 1710. The excess output produced by the engine may be converted by the energy conversion device and stored by the energy storage device. Thus, the engine may operate at substantially steady state. Response 1730 shows how the engine operating in SI mode can reduce output while storing some of the excess energy. Alternatively, response 1740 may be used, wherein the output of the engine operating in SI mode supplies the requested output and no energy is stored by the energy storage device. In some embodiments, a reduction in engine output may be accomplished through deactivating one or more cylinders, thus decreasing the engine displacement and overall maximum output. Thus, some of the cylinders operating in SI mode may remain in steady state, while reducing the total engine output through deactivating one or more cylinders. Alternatively, response 1750 may be used, wherein the engine is transitioned to HCCI mode (i.e. all of the cylinders are transitioned). Response 1760 shows how some of the cylinders can operate in SI mode and some of the cylinders can operate in HCCI mode to meet the requested wheel output. Response 1760 can also include deactivating one or more cylinders to further reduce the engine output.

In another embodiment, the engine may be operating in HCCI mode at the time when it is determined to purge the fuel vapors. In this case, the vapor purging operation may be initiated with the engine still operating in HCCI mode. As in the approaches described above, the hybrid propulsion system can be used to reduce the effect of fluctuations in engine output delivered to the drive wheels, thereby improving vehicle control during the fuel vapor operations while in HCCI mode.

The various control routines described herein seek to increase and/or maximize the overall efficiency of the hybrid propulsion system by (1) avoiding transitions between combustion modes for the engine by using the hybrid system to supply or absorb output as needed, (2) if a transition of one or more cylinders is desired, using the hybrid system to facilitate the transition by reducing output discontinuities and/or NVH, and (3) considering the condition of the lean NOx trap, energy storage device, and engine operating conditions when determining a combustion mode for one or more of the engine cylinders.

It will be appreciated that the configurations and routines disclosed herein are exemplary in nature, and that these specific embodiments are not to be considered in a limiting sense, because numerous variations are possible. For example, the above technology can be applied to V-6, V-8, I-4, I-6, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A hybrid vehicle propulsion system, comprising:
    an engine having at least one combustion cylinder configured to operate in a first and a second combustion mode, wherein the first combustion mode is a spark ignition mode and the second combustion mode is a compression ignition mode, wherein the engine is configured to supply an engine output, the engine further comprising a lean NOx trap configured to store NOx produced by the engine;
    a motor configured to selectively supply or absorb a secondary output;
    an energy storage device configured to selectively store at least a portion of the engine output and selectively supply energy to the vehicle; and
    a control system configured to control at least the engine, the motor, and the energy storage device, wherein the control system is configured to selectively operate said at least one combustion cylinder in one of the spark ignition mode and the compression ignition mode based on a condition of the energy storage device, and to selectively operate said at least one combustion cylinder in one of the spark ignition mode and the compression ignition mode based on a condition of the lean NOx trap.

2. The system of claim 1, wherein said condition of the energy storage device includes an amount of energy stored by the energy storage device.

3. The system of claim 1, wherein said condition of the energy storage device is a battery state of charge.

4. The system of claim 2, wherein the control system is configured to operate said at least one cylinder in the spark ignition mode when a low amount of energy is stored by the energy storage device and wherein the control system is configured to operate said at least one cylinder in the compression ignition mode when a larger amount of energy is stored by the energy storage device.

5. A hybrid vehicle propulsion system, comprising:
an engine having at least one combustion cylinder configured to operate in a first and a second combustion mode, wherein the first combustion mode is a spark ignition mode and the second combustion mode is a compression ignition mode, wherein the engine is configured to supply an engine output, the engine further comprising a lean NOx trap configured to store NOx produced by the engine;
an energy conversion device configured to selectively supply or absorb a secondary output;
an electrical energy storage device configured to selectively store at least a portion of the engine output and selectively supply energy to the vehicle; and
a control system configured to control at least the engine, the conversion device, and the energy storage device, wherein the control system is configured to selectively operate said at least one combustion cylinder in one of the spark ignition mode and the compression ignition mode based on a condition of the energy storage device, said condition of the electrical energy storage device including an amount of electrical energy stored by the energy storage device, the control system further configured to operate said at least one cylinder in the spark ignition mode when a lower amount of energy is stored by the energy storage device and wherein the control system is configured to operate said at least one cylinder in the compression ignition mode when a larger amount of energy is stored by the energy storage device, and to selectively operate said at least one combustion cylinder in one of the spark ignition mode and the compression ignition mode based on a condition of the lean NOx trap.

6. A method of operating an engine having at least one combustion cylinder configured to produce at least a first portion of a vehicle wheel output, wherein the engine is configured to selectively operate said at least one combustion cylinder in one of a compression ignition mode and a spark ignition mode, the engine coupled in a hybrid propulsion system including a battery, the engine including a lean NOx trap in an exhaust of the engine, the method comprising:

performing the compression ignition lean mode in said at least one combustion cylinder during a first condition;
performing a transition in said at least one combustion cylinder from the compression ignition mode to the spark ignition mode during a second condition and in response to a battery state of charge and based on whether purging of the NOx trap is required due to capacity of the NOx trap; and
performing the spark ignition mode in said at least one combustion cylinder during a third condition.

7. The method of claim 6, wherein the third condition includes a higher engine output torque than said first condition.

8. The method of claim 6, wherein the first condition is when the vehicle wheel output is less than when in the third condition.

9. The method of claim 6, wherein the third condition includes a different gear ratio than said first condition.

10. The method of claim 6, wherein the hybrid propulsion system further includes at least a traction motor, the method further comprising producing at least a portion of the vehicle wheel output via the motor.

11. The method of claim 10 further comprising operating the traction motor to produce at least said portion of the vehicle wheel output during said first condition; and operating the motor to absorb at least some of the vehicle wheel output produced by the engine during said third condition.

12. The method of claim 10 further comprising first determining whether the NOx trap capacity is sufficient and second determining whether sufficient stored energy is available in the battery, where the transition is performed in response to the first and second determinations.

13. The method of claim 10 further comprising performing a second transition in said at least one combustion cylinder from the spark ignition mode to the compression ignition mode, where before the second transition and while still operating in the spark ignition mode, purging the lean NOx trap and increasing battery state of charge.

* * * * *